(12) United States Patent
Lucas et al.

(10) Patent No.: US 12,072,219 B2
(45) Date of Patent: Aug. 27, 2024

(54) APPARATUS FOR MONITORING FLUID FLOW IN A PIPE USING ELECTROMAGNETIC VELOCITY TOMOGRAPHY

(71) Applicant: ENERCORP ENGINEERED SOLUTIONS, LLC, New Castle, DE (US)

(72) Inventors: Gary Lucas, Basingstoke (GB); Ogheneochuko Obie, Basingstoke (GB)

(73) Assignee: ENERCORP ENGINEERED SOLUTIONS, LLC, New Castle, DE (US)

( * ) Notice: Subject to any disclaimer, the term of this patent is extended or adjusted under 35 U.S.C. 154(b) by 0 days.

(21) Appl. No.: 17/766,875

(22) PCT Filed: Oct. 14, 2020

(86) PCT No.: PCT/EP2020/078942
§ 371 (c)(1),
(2) Date: Apr. 6, 2022

(87) PCT Pub. No.: WO2021/074241
PCT Pub. Date: Apr. 22, 2021

(65) Prior Publication Data
US 2024/0085227 A1     Mar. 14, 2024

(30) Foreign Application Priority Data

Oct. 15, 2019    (GB) ...................................... 1914909

(51) Int. Cl.
   G01F 1/58        (2006.01)
   G01F 1/60        (2006.01)
(52) U.S. Cl.
    CPC ................ G01F 1/588 (2013.01); G01F 1/60 (2013.01)

(58) Field of Classification Search
CPC . G01F 1/667; G01F 1/662; G01F 1/74; G01F 1/8413; G01F 1/58; G01F 1/8436;
(Continued)

(56) References Cited

U.S. PATENT DOCUMENTS 3,412,608 A    11/1968   Haacke
3,527,095 A     9/1970   Wada
(Continued)

FOREIGN PATENT DOCUMENTS

CN           204694303 U     10/2015
DE      102011083549 A1 *   3/2013    .............  G01F 1/586
(Continued)

OTHER PUBLICATIONS

Combined Search and Examination Report under Sections 17 and 18(3) in related GB Application No. 1914909.5 issued on Apr. 16, 2020.
(Continued)

*Primary Examiner* — Andre J Allen
(74) *Attorney, Agent, or Firm* — MH2 TECHNOLOGY LAW GROUP, LLP

(57) ABSTRACT

The present invention relates to apparatus for monitoring fluid flow in a pipe using electromagnetic velocity tomography (EVT). The apparatus generates a magnetic field within a pipe and when electrically conducting fluid, such as an aqueous phase, flowing along the pipe passes through the magnetic field, flow induced voltages are generated by magnetic induction which are detected by electrodes. The signals at the electrodes can be processed to produce images of the flow velocity profile in the pipe. The flow may be a multiphase flow which comprises fluids, and may comprise a mixture of liquids, or one or more liquids in a mixture with solids and/or gases. This invention may provide a multiphase flow metering apparatus which has a number of
(Continued)

applications, in particular within the oil and gas exploration and production industry.

24 Claims, 6 Drawing Sheets

(58) Field of Classification Search
CPC ... G01F 1/66; G01F 1/60; G01F 25/10; G01F 1/8477; G01F 1/588; G01F 15/024; G01F 1/584; G01F 1/8409; G01F 1/8431; G01F 1/849; G01F 1/663; G01F 1/3209; G01F 1/8486; G01F 1/3266; G01F 1/586; G01F 1/8472; G01F 1/86; G01F 1/8427; G01F 15/14; G01F 1/712; G01F 1/3218; G01F 1/8418; G01F 1/8422; G01F 1/002; G01F 1/64; G01F 1/668; G01F 1/704; G01F 15/00; G01F 5/00; G01F 1/7082; G01F 1/00; G01F 1/3287; G01F 1/708; G01F 15/18; G01F 1/80; G01F 1/3259; G01F 1/666; G01F 1/88; G01F 1/56; G01F 1/6842; G01F 15/08; G01F 1/3227; G01F 1/28; G01F 1/8404; G01F 1/50; G01F 15/02; G01F 1/34; G01F 1/44; G01F 15/185; G01F 1/32; G01F 15/063; G01F 1/363; G01F 1/325; G01F 1/36; G01F 1/8495; G01F 1/684; G01F 1/7086; G01F 1/84; G01F 7/00; G01F 1/8481; G01F 15/022; G01F 1/82; G01F 1/78; G01F 15/006; G01F 1/7084; G01F 1/20; G01F 1/8468; G01F 1/7088; G01F 1/661; G01F 1/72; G01F 1/8454; G01F 1/3282; G01F 1/007; G01F 1/3273; G01F 1/68; G01F 1/6845; G01F 1/76; G01F 15/0755; G01F 15/005; G01F 1/115; G01F 1/40; G01F 15/068; G01F 1/10; G01F 1/696; G01F 1/90; G01F 1/582; G01F 23/2962; G01F 1/42; G01F 1/8445; G01F 15/046; G01F 25/15; G01F 1/6965; G01F 1/7044; G01F 1/056; G01F 1/125; G01F 1/665; G01F 1/206; G01F 1/6847; G01F 1/7046; G01F 15/04; G01F 25/13; G01F 1/075; G01F 1/46; G01F 15/06; G01F 1/52; G01F 15/003; G01F 15/12; G01F 1/24; G01F 1/3236; G01F 1/06; G01F 13/006; G01F 15/066; G01F 25/0092; G01F 1/844; G01F 1/6986; G01F 15/043; G01F 15/065; G01F 25/17; G01F 1/7042; G01F 15/10; G01F 3/10; G01F 3/38; G01F 1/692; G01F 17/00; G01F 22/00; G01F 1/698; G01F 3/00; G01F 3/16; G01F 1/22; G01F 1/30; G01F 1/383; G01F 1/688; G01F 1/6888; G01F 1/716; G01F 15/007; G01F 15/061; G01F 15/075; G01F 23/284; G01F 9/001; G01F 1/05; G01F 1/08; G01F 23/263; G01F 23/296; G01F 25/00; G01F 3/20; G01F 7/005; G01F 1/7048; G01F 1/8459; G01F 1/8463; G01F 13/00; G01F 1/69; G01F 15/002; G01F 15/07; G01F 23/26; G01F 1/103; G01F 23/292; G01F 23/804; G01F 25/14; G01F 1/845; G01F 23/24; G01F 23/268; G01F 25/11; G01F 5/005; G01F 1/12; G01F 1/54; G01F 1/699; G01F 23/14; G01F 23/2965; G01F 3/30; G01F 1/065; G01F 11/00; G01F 15/125; G01F 23/22; G01F 23/266; G01F 1/372; G01F 1/6882; G01F 1/6884; G01F 11/24; G01F 13/008; G01F 15/028; G01F 23/2961; G01F 23/2968; G01F 9/00; G01F 9/008; G01F 1/0755; G01F 1/26; G01F 1/48; G01F 11/284; G01F 13/001; G01F 19/00; G01F 22/02; G01F 23/241; G01F 23/2967; G01F 23/30; G01F 25/12; G01F 3/065; G01F 3/08; G01F 3/18; G01F 3/24; G01F 1/005; G01F 1/053; G01F 1/106; G01F 1/37; G01F 1/375; G01F 11/28; G01F 15/001; G01F 23/18; G01F 23/265; G01F 23/2966; G01F 23/80; G01F 3/04; G01F 3/06; G01F 3/26; G01F 1/07; G01F 1/11; G01F 1/1155; G01F 1/203; G01F 11/06; G01F 11/086; G01F 11/22; G01F 13/003; G01F 15/026; G01F 23/00; G01F 23/02; G01F 23/164; G01F 23/165; G01F 23/20; G01F 23/242; G01F 23/245; G01F 23/246; G01F 23/282; G01F 23/288; G01F 23/2928; G01F 23/64; G01F 23/72; G01F 23/802; G01F 25/0084; G01F 3/02; G01F 3/22; G01F 3/221; G01F 3/222; G01F 3/224; G01F 3/227; G01F 3/228; G01F 3/36; G01F 9/006; G01F 1/377; G01F 1/38; G01F 1/386; G01F 1/6886; G01F 1/6983; G01F 11/006; G01F 11/029; G01F 11/10; G01F 11/12; G01F 11/32; G01F 15/008; G01F 23/0007; G01F 23/0046; G01F 23/04; G01F 23/168; G01F 23/247; G01F 23/2927; G01F 23/44; G01F 23/603; G01F 23/68; G01F 23/806; G01F 23/808; G01F 3/12; G01F 9/005; G01F 9/023
USPC .............................................. 73/861–861.356
See application file for complete search history.

(56) References Cited

U.S. PATENT DOCUMENTS

| | | | | |
|---|---|---|---|---|
| 7,621,188 B2* | 11/2009 | Lincoln | ........... | G01F 1/586 |
| | | | | 73/861.12 |
| 10,732,017 B2* | 8/2020 | Wang | ............ | F17D 3/10 |
| 11,629,982 B2* | 4/2023 | Mariager | ............ | G01F 25/10 |
| | | | | 73/861.12 |
| 11,698,314 B2* | 7/2023 | Krywyj | ............ | G01N 33/18 |
| | | | | 73/53.01 |
| 2021/0270645 A1* | 9/2021 | Ma | ............ | G01N 33/2823 |
| 2023/0142240 A1* | 5/2023 | Leeungculsatien | ....... | G01F 1/74 |
| | | | | 73/53.04 |
| 2024/0085228 A1* | 3/2024 | Lucus | ............ | G01F 1/74 |

FOREIGN PATENT DOCUMENTS

| | | | | |
|---|---|---|---|---|
| DE | 102016110059 A1 * | 8/2017 | ............ | G01F 1/586 |
| EP | 3211384 A2 * | 8/2017 | ............ | G01F 1/586 |
| EP | 3022532 B1 * | 10/2021 | ............ | G01F 1/586 |
| EP | 4067832 A1 * | 10/2022 | ............ | G01F 1/586 |
| FR | 1308097 A | 11/1961 | | |
| GB | 978900 A | 12/1964 | | |
| GB | 990484 A | 4/1965 | | |
| GB | 1324447 A | 7/1973 | | |
| GB | 2543587 A | 4/2017 | | |
| WO | 2015140574 A1 | 9/2015 | | |

OTHER PUBLICATIONS

International Search Report and Written Opinion in related international application No. PCT/EP2020/078942 issued on Jan. 21, 2021.

(56) References Cited

OTHER PUBLICATIONS

"Reconstruction of Velocity Profiles in Axisymmetric and Asymmetric Flows Using and Electromagnetic Flow Meter" by Kollar, et al.; Measurement Science and Technology, IOP, Bristol, GB, vol. 26, No. 5, Mar. 31, 2015.
International Preliminary Report on Patentability issued in related application PCT/EP2020/078942 on Apr. 19, 2022.
Examination Report dated Mar. 22, 2024, GB Application No. GB1914909.5, 4 pages.

\* cited by examiner

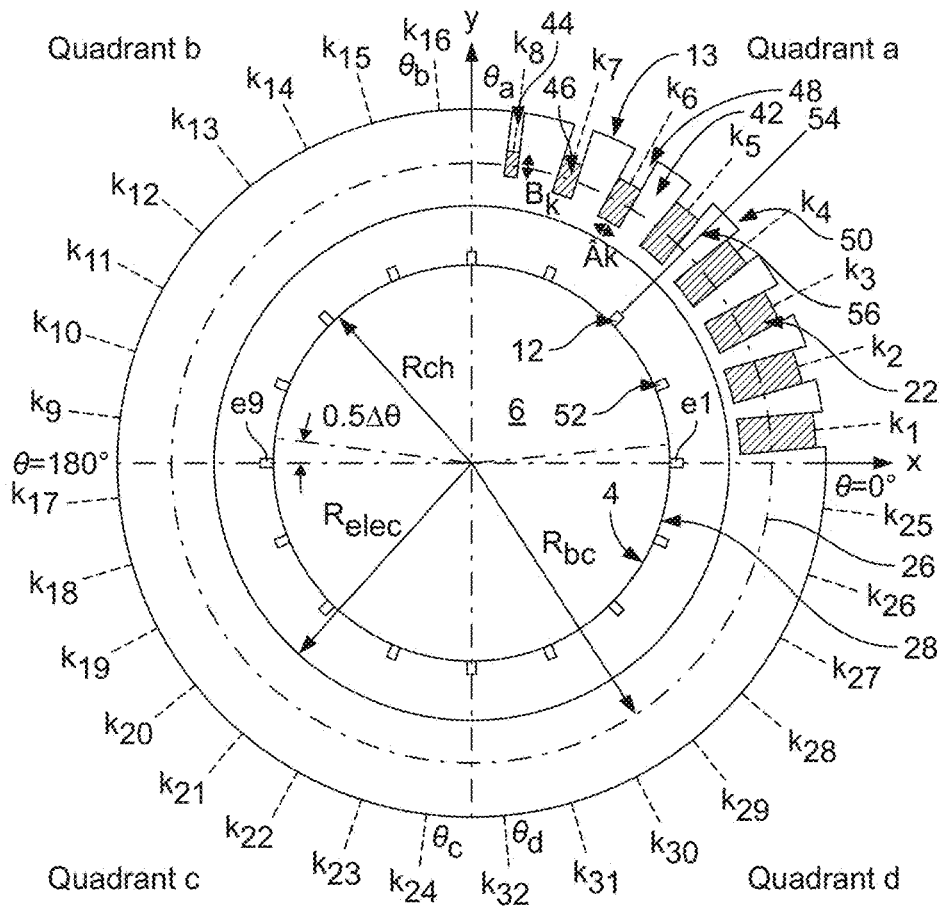
FIG. 3
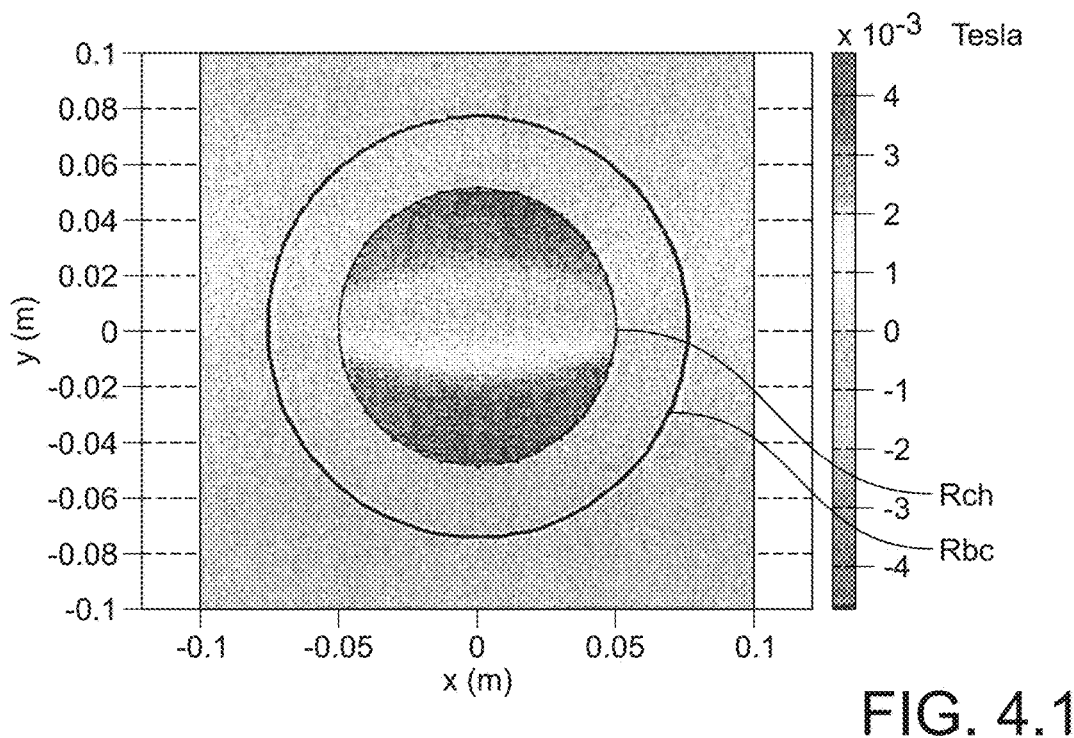
FIG. 4.1

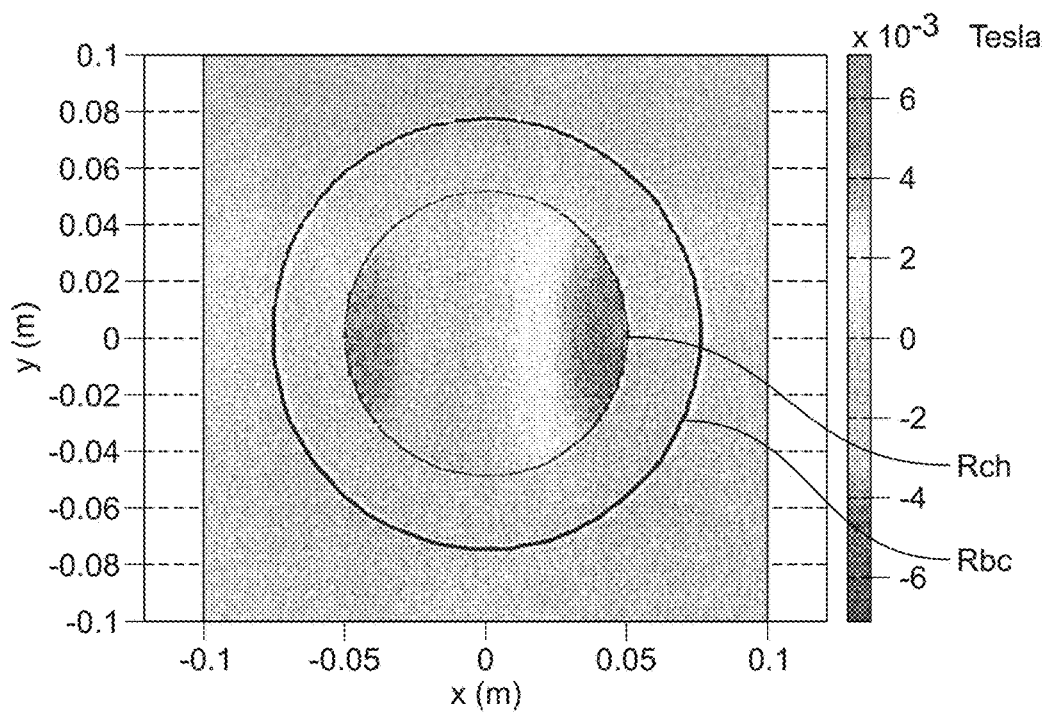
FIG. 4.2
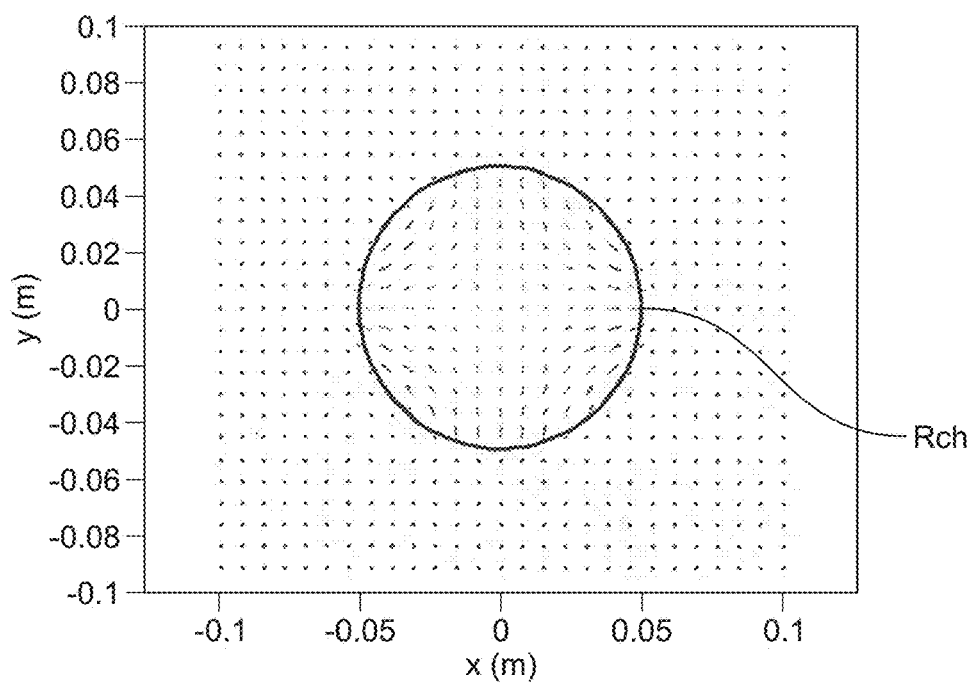
FIG. 4.3

APPARATUS FOR MONITORING FLUID FLOW IN A PIPE USING ELECTROMAGNETIC VELOCITY TOMOGRAPHY

FIELD OF THE INVENTION

The present invention relates to apparatus for monitoring fluid flow in a pipe using electromagnetic velocity tomography (EVT). The apparatus generates a magnetic field within a pipe and when electrically conducting fluid, such as an aqueous phase, flowing along the pipe passes through the magnetic field, flow induced voltages are generated by magnetic induction which are detected by electrodes. The signals at the electrodes can be processed to produce images of the flow velocity profile in the pipe. The flow may be a multiphase flow which comprises fluids, and may comprise a mixture of liquids, or one or more liquids in a mixture with solids and/or gases. This invention may provide a multiphase flow metering apparatus which has a number of applications, in particular within the oil and gas exploration and production industry.

BACKGROUND

Electromagnetic Velocity Tomography (EVT) requires the use of a multi-electrode electromagnetic flowmeter (EMFM) which has a coil excitation system with specific structural and functional requirements. For example:

i. The coil excitation system should be compact and occupy minimal space.

ii. The coil excitation system should be capable of generating a 'uniform' magnetic field in the flow cross section of the EMFM with a flux density distribution which is either stationery or which varies sinusoidally at a frequency $f_1$.

iii. The coil excitation system should also be capable of generating a highly 'non-uniform' magnetic field in the flow cross section of the EMFM which is either stationery or which varies sinusoidally at a frequency $f_2$.

iv. For a given value of the flow channel radius $R_{ch}$ and a given amplitude $I_1$ of the electrical current flowing in the coil excitation system at frequency $f_1$, the amplitude $B_u$ of the flux density associated with the uniform magnetic field should ideally be as high as possible—subject to the dimensional constraints as outlined in paragraph i above and constraints associated with the maximum allowable inductive coil impedance at frequency $f_1$.

iv. Ideally, in the flow cross section of the EMFM at the plane of the electrode array (the plane being defined by orthogonal x- and y axes, with a z axis being orthogonal to the plane and in the direction of fluid flow), the uniform magnetic field is one-dimensional—such that, at any instant in time, the local magnetic flux density vector is of constant amplitude everywhere and points in the same direction parallel to the y-axis everywhere. The uniform magnetic field should preferably have no, or negligible, components in the x and z directions. Such a one-dimensional, uniform magnetic field is referred to in this patent specification as 'homogeneous'.

v. The homogeneity of the one-dimensional uniform magnetic field, described above for the EMFM flow cross section at the plane of the electrode array, should be preserved for all EMFM flow cross sections within axial distances of least $\pm D_{ch}$ from the plane of the electrode array where $D_{ch}$ is the internal diameter of the flow tube.

vi. At any instant in time, the non-uniform magnetic field generated by the coil excitation system must have large spatial variations in both the magnitude and direction of the local flux density vector in the EMFM flow cross-section at the plane of the electrode array. This is to facilitate good discrimination between the flow induced potential distributions, associated with this non-uniform magnetic field, that would be produced by the 'candidate' velocity profiles predicted using an EVT reconstruction algorithm, for example as disclosed in Kollar L E, Lucas G P and Meng Y, "Reconstruction of velocity profiles in axisymmetric and asymmetric flows using an electromagnetic flow meter". Meas. Sci. Technol., 26 (2015) 055301.

vii. For a given value of the flow channel radius $R_{ch}$ and a given amplitude $I_2$ of the electrical current flowing in the coil excitation system at frequency $f_2$, the amplitude $B_{op}$ of the reference magnetic flux density associated with the non-uniform magnetic field should preferably be as high as possible—subject to the dimensional constraints outlined in paragraph i above and constraints associated with the maximum allowable inductive coil impedance at frequency $f_2$.

viii. In the flow cross-section of the EMFM at the plane of the electrode array and at any instant in time, the local flux density vectors associated with the non-uniform magnetic field should preferably only have components in the x and y directions. Flux density components in the z direction should preferably be zero or negligible. Thus in the EMFM flow cross-section at the plane of the electrode array, the non-uniform magnetic field is two-dimensional. This requirement of two-dimensionality for the non-uniform magnetic field enables calculation of the weight vector values, required by an EVT reconstruction algorithm, for example as disclosed in the Kollar et al reference referred to hereinabove.

ix. The two-dimensionality of the non-uniform magnetic field, described above for the EMFM flow cross section at the plane of the electrode array, should be preserved for all EMFM flow cross sections within axial distances of at least $\pm D_{ch}$ from the plane of the electrode array. This, again, greatly facilitates calculation of weight vector values using two-dimensional virtual current theory as described in paragraph viii) above.

x. A final requirement of the coil excitation system is that it should be designed in such a way that so-called 'quadrature potentials'—inductively coupled into the signal cables, leading from the EMFM electrodes to the signal processing circuitry—should be minimised.

The number of suitable apparatus for generating magnetic fields with the properties outlined above is actually quite small. For example, permanent magnets are not a feasible option due to the EVT requirement of simultaneously applying the uniform and non-uniform magnetic fields at frequencies $f_1$ and $f_2$ respectively.

Helmholtz coils have previously been used in EVT applications. However Helmholtz coils suffer from a number of important limitations including:

(i) Helmholtz coils are very bulky and space consuming. The mean diameter of each Helmholtz coil is generally greater than, or about equal to, twice the outer diameter of the flow tube. This means that Helmholtz coils cannot be used in applications where space is limited, for example downhole in an oil well.

(ii) A non-uniform magnetic field, which is generated using a Helmholtz coil by driving the electrical current in opposite directions in each coil, is also known as an anti-Helmholtz field and is strongly axisymmetric. It therefore violates the requirements, given in paragraphs viii and ix above, that the non-uniform magnetic field must contain no components in the z direction at the plane of the electrode array and must be invariant with axial position in the vicinity of the plane of the electrode array. The violation of these conditions has meant that the weight vector values required by the EVT velocity profile reconstruction algorithm could not be calculated using two dimensional virtual current theory but had to be calculated in a time-consuming way using expensive, proprietary finite element software.

(iii) A third limitation associated with the use of Helmholtz coils is their 'inefficiency'. For any coil system used to generate a magnetic field in a flow conduit an 'efficiency' parameter $k_1$ can be defined as $$k_1 = \frac{BR_{ch}}{NI}$$

where B is a representative flux density of the magnetic field generated in the flow conduit, N represents the number of turns per coil, I is the electrical current per coil and $R_{ch}$ is the internal radius of the flow conduit. For fixed $R_{ch}$, the higher the value of $k_1$, the greater the magnetic flux density in the flow conduit for given values of I and N. It has been found empirically by the present inventors that for Helmholtz coil systems used in EVT applications, the value of $k_1$ is relatively low. This inefficiency is particularly noticeable for Helmholtz coils designed for EVT applications involving flow tubes with relatively small internal radii ($R_{ch} \leq 0.025$ m).

An alternative method for generating magnetic fields involves the use of the cosine coil, as disclosed for example in Coillot C. et al, "The magnetic field homogeneity of coils by means of the space harmonics suppression of the current density distribution", J. Sens. Sens. Syst., 5, 401-408, 2016. In a cosine coil system, the wires are wrapped around the external contours of the flow tube in such a way that when viewed in cross section, at a given angular position θ, measured using a coordinate system defined by x and y axes and the angle θ being defined with respect to the increasing x-axis, the number of wires is proportional to |cos θ|. Because the wires follow the contours of the flow tube, the cosine coil requires far less space than a Helmholtz coil for a given value of $R_{ch}$, thus fulfilling the requirement of paragraph i above.

It has also been shown in the Coillot C. et al reference that a cosine coil system can generate a highly homogeneous, one-dimensional, 'uniform' magnetic field in a flow tube, which is invariant with axial position within the flow tube (see paragraphs iv and v above).

Previous implementations of cosine coils described in the literature have revealed limitations which mean that they are not entirely suitable for use in EVT applications. Such limitations include:

(i) Many previous cosine coils consist of a single length of wire which is wound many times around the flow tube. When viewed in cross-section, the turns are arranged in batches with the number of 'wire cross-sections' in a given batch (hereinafter referred to as the number of wires in the batch) being proportional to the magnitude of the cosine of the angle which the geometric centre of the batch subtends with the increasing x-axis. The use of a single length of wire means that it would be impossible to generate a non-uniform field—which generally requires the use of two separate coils with the currents flowing in the opposite directions in each coil.

(ii) Previous cosine coils, for example as disclosed in U.S. Pat. No. 3,412,608, have included batches of wires at angular positions θ (measured with respect to the increasing x-axis) of 0° and 180° which, again, inhibits generation of the non-uniform magnetic field. A cosine coil arrangement as disclosed in U.S. Pat. No. 3,412,608, having wire batches at angular positions 0° and 180°, is not suitable for EVT applications because in such EVT applications it is necessary to generate both a uniform magnetic field and a highly non-uniform magnetic field.

(iii) Previous implementations of cosine coils, for example as again disclosed in U.S. Pat. No. 3,412,608, have constrained the wire batches to circular holes machined into the coil supports. This necessarily limits the total number of turns that can be used in the cosine coil and therefore limits the maximum flux densities that can achieved for the uniform and non-uniform magnetic fields.

SUMMARY OF THE INVENTION

The present invention aims to overcome the limitations described above, associated with previous designs of cosine coil systems, which prevent their use in EVT applications. The present invention also aims to provide a practical cosine coil system for use in EVT applications.

The present invention aims, at least partially, to meet this need in the art, particularly in the field of oil and gas exploration and production, to provide an apparatus which can monitor a fluid flow in a pipe using electromagnetic velocity tomography (EVT) to provide enhanced analytical data in real-time on the velocity distribution within the conducting continuous phase of multiphase fluid/solid flows, particularly within a pipeline used in the oil and gas industry.

The present invention accordingly provides an apparatus according to claim 1 for monitoring a fluid flow in a pipe using electromagnetic velocity tomography (EVT).

Preferred features are defined in the dependent claims.

The preferred embodiments of the present invention can provide an apparatus for monitoring a fluid flow in a pipe using electromagnetic velocity tomography (EVT) in which a coil system comprising electrically conductive wires for generating composite magnetic fields within the flow conduit incorporates a cosine coil configuration which is capable of generating uniform and non-uniform magnetic fields which are required for Electromagnetic Velocity Tomography (EVT). The cosine coil system can easily be scaled to accommodate flow pipes having a wide range of internal diameters.

BRIEF DESCRIPTION OF THE DRAWINGS

Embodiments of the present invention will now be described, by way of example only, with reference to the accompanying drawings, in which:

FIG. 3 is an enlarged schematic cross-section of first (upper) and second (lower) cosine coils in an apparatus according to another embodiment of the present invention;

FIGS. 4.1, 4.2 and 4.3 are schematic representations of the distribution of, respectively, the y-component, the x-component and the flux density vector, of the non-uniform magnetic field in the flow cross section in the apparatus of FIG. 1;

DETAILED DESCRIPTION

Figure 1:
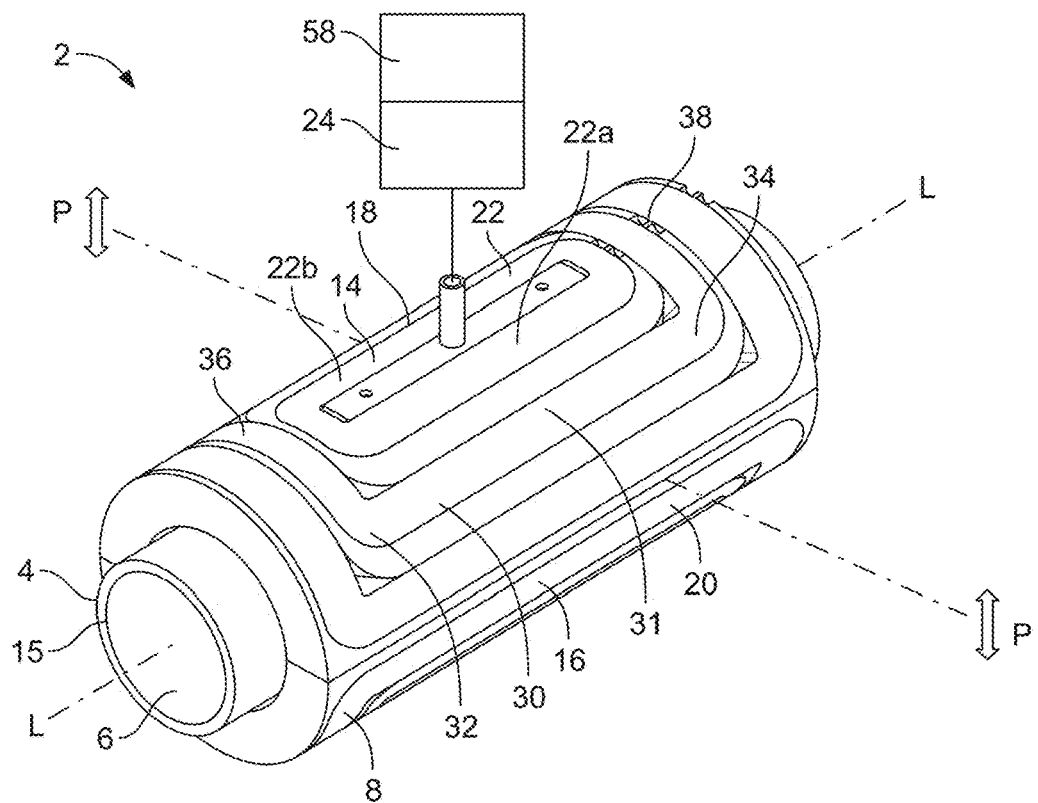
FIG. 1 is a schematic perspective view of an apparatus for monitoring a fluid flow in a pipe using electromagnetic velocity tomography (EVT) in accordance with a first embodiment of the present invention.
Figure 2:
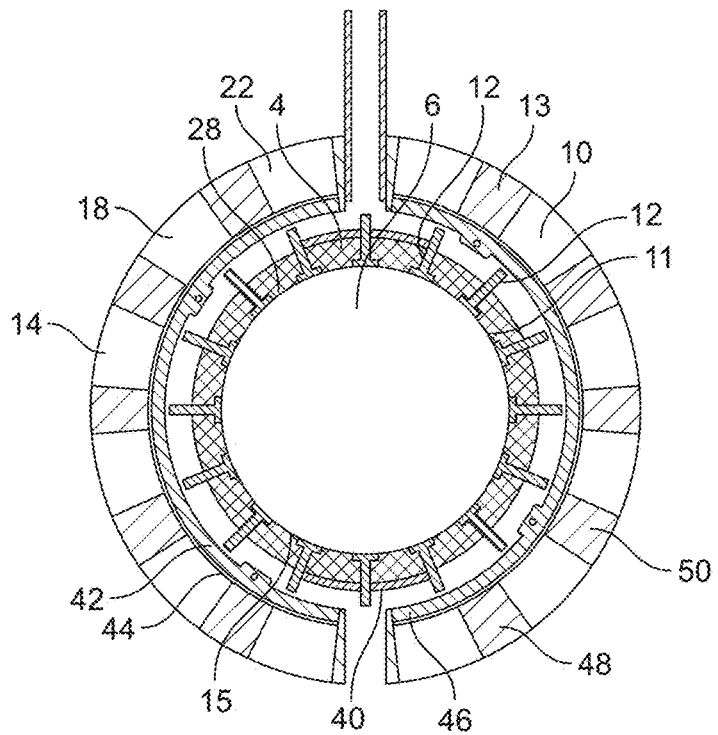
FIG. 2 is a schematic cross-section in a plane P-P of the apparatus of FIG. 1.

Referring to FIGS. 1 and 2, there is shown an apparatus 2 for monitoring a fluid flow in a pipe using electromagnetic velocity tomography (EVT) in accordance with an embodiment of the present invention. In the illustrated embodiments of the present invention, the apparatus 2 is arranged to measure the velocity profile of a single phase flow of an electrically conducting fluid in the pipe or is arranged to measure the velocity profile of a continuous electrically conducting phase of a multiphase fluid flow in the pipe.

In this specification, the term "pipe" is to be construed broadly and means any tubular body, or tube, defining a flow conduit of any shape and size and the tubular body may be composed of any material or combination of materials, including electrically non-conducting materials, compatible with the use by electromagnetic velocity tomography (EVT) in which magnetic fields are transmitted into the flow conduit and the detection of voltages induced in the electrically conducting fluid in the flow conduit.

In use, the electrically conducting fluid is typically an aqueous phase, which is present in either a single phase or present in a multiphase fluid. When used in the field of oil and gas exploration and production, such a multiphase flow comprises, in addition to an aqueous phase, at least one phase, optionally at least two phases, further optionally all of the phases, selected from an oil phase, a solid phase and a gaseous phase. The multiphase flow typically has a primary or continuous phase of the flow, e.g., oil, water or gas, and within the primary phase one or more other phase constituents may be present, for example a solid phase, e.g. sand. The flow regime of these phases can vary significantly depending on the concentrations of each phase and the flow rate.

The apparatus 2 comprises a pipe 4 defining a flow conduit 6 along which, in use, fluid flows, and the fluid flow is to be monitored using electromagnetic velocity tomography (EVT) as described hereinbelow. The apparatus 2 further comprises a coil system 8 comprising electrically conductive wires 10 located externally of the flow conduit 6 for generating composite magnetic fields within the flow conduit 6. In addition, the apparatus 2 comprises an array of electrodes 12 located around the flow conduit 6 for detecting voltages induced in an electrically conducting fluid flowing along the pipe 4 and thorough the magnetic field. The electrodes used in the apparatus of the present invention may be configured to be contacting electrodes, which in use electrically contact the electrically conducting fluid, or capacitively coupled non-contacting electrodes, which in use are capacitively coupled to, and do not electrically contact, the electrically conducting fluid. In the illustrated embodiment of the present invention, a radially inner end 11 of each electrode is located at the inner circumferential surface 15 of the pipe 4 so that, in use, the electrode 12 is in electrical connection with fluid flowing within the flow conduit 6 of the pipe 4. In an alternative embodiment of the present invention, the electrodes 12 are separated from the flow conduit 6 by a thickness of the pipe 4 and, in use, are capacitively coupled to the fluid flow in the flow conduit 6 of the pipe 4; capacitively coupled non-contacting electrodes in flowmeters are known to the person skilled in the art from, for example, U.S. Pat. No. 4,953,408, US-A-2010/071476 and U.S. Pat. No. 4,513,624. Therefore the present invention encompasses the use of both contacting and non-contacting electrodes.

The coil system 8 comprises first and second coils 14, 16 on respective opposite sides of the pipe 4. Each of the first and second coils 14, 16 comprises a respective plurality of sub-coils 18, 20, in series within the respective coil 14, 16, and each sub-coil 18, 20 comprises a plurality of wire batches 22.

In the illustrated embodiment, each wire batch 22 is electrically connected to magnetic signal driving circuitry 24 arranged to pass electrical current through one or more of the wire batches 22 thereby to transmit a magnetic field from the wire batches 22 into the flow conduit 6.

The magnetic signal driving circuitry 24 is typically arranged or configured to pass electrical current (i) in a first operational mode through one or more of the wire batches 22 of both of the first and second coils 14, 16 so that, when the apparatus shown in FIG. 1 is viewed in plan from above, in each of the first and second coils 14, 16 the electrical current is in the same rotational direction to generate a uniform magnetic field in the flow conduit 6 in the first operational mode and (ii) in a second operational mode through one or more of the wire batches 22 of both of the first and second coils 14, 16 so that, when the apparatus shown in FIG. 1 is viewed in plan from above, in the first and second coils 14, 16 the electrical current is in respective opposite rotational directions to generate and a non-uniform magnetic field in the flow conduit 6 in the second operational mode. The magnetic signal driving circuitry 24 is configured selectively to drive the first and second coils 14, 16 in either of the first and second operational modes.

When viewed in cross-section, the windings of the first (upper) and second (lower) coils 14, 16 of the coil system form an array of discrete batches 22 of electroconductive wires. For example, the batches 22 may have a rectangular cross-section. By increasing the aspect ratio of the cross-section of the wire batches 22, the flux densities of the uniform and non-uniform magnetic fields can be increased as required without compromising the desired properties of these magnetic fields e.g. the homogeneity of the uniform field.

The structural arrangement of the coil system 8 comprising the first and second coils 14, 16 will now be described in detail, referring to FIG. 3 which shows another embodiment which is modified as compared to the embodiment of FIGS. 1 and 2. Like parts are identified by like reference numerals.

As compared to the apparatus shown in FIGS. 1 and 2, in FIG. 3 the coil system 8 has a greater number of sub-coils 18, 20 in each of the respective first and second coils 14, 16 so that the geometrical structure of the coil system can be clearly described. The mathematical and geometric functions of the cosine-coil structure of the coil system are described below with reference to FIG. 3, but apply generally to the coil system in the apparatus of various embodiments of the present invention.

Also, as described below, in FIG. 3 each wire batch has a particular cross-sectional shape and location relative to the fluid conduit, whereas in the embodiment of FIGS. 1 and 2, and similarly in the further embodiment of FIGS. 5 to 10, each wire batch has a different cross-sectional shape and location relative to the fluid conduit as compared to the structural arrangement of the coil system 8 shown in FIG. 3.

Referring to FIG. 3, in accordance with the present invention, the position of the electrically conductive wires 10 around the flow conduit 6 is defined by a coordinate system. In this embodiment, the coordinate system has mutually orthogonal x and y axes extending in positive and negative directions in the first plane P from an origin O located at a geometrical centre of a cross-section of the flow conduit 6. The first plane P is orthogonal to the longitudinal direction L-L of the flow conduit 6.

The x and y axes define four quadrants, a, b, c and d. For clarity of illustration, FIG. 3 illustrates the sub-coil 18 in only one of four quadrants, i.e. quadrant a. The location of the wire batches 22 in the four quadrants are indicated by the letters k from k=1 to k=32. In the embodiment of FIG. 3 therefore, there would be thirty two wire batches 22, each located around the flow conduit 6 at a respective position denoted by the letter k.

As described above with reference to FIGS. 1 and 2, the coil system 8 comprises the first and second coils 14, 16 which are located on respective opposite sides of the x axis. In the illustrated embodiment, the first coil 14 is shown as an "upper" coil and the second coils 16 is shown as a "lower" coil; however, these orientations are non-limiting and the pipe 4 and the coil system 8 may be provided at any desired orientation.

Each of the first and second coils 14, 16 respectively comprises K sub-coils 18, 20, wherein K>1. In each of the first and second coils 14, 16 the respective sub-coils 18, 20 are electrically connected together in series. In each of the first and second coils 14, 16, the respective sub-coils 18, 20, are mutually circumferentially nested together and extend parallel to the longitudinal direction L-L of the flow conduit 6.

Accordingly, as shown in FIG. 1, each of the sub-coils 18, 20, when viewed in cross-section orthogonal to the longitudinal direction L-L, comprises a respective pair of wire batches 22a, 22b on respective opposite sides of the y axis. The first and second coils 14, 16 cumulatively comprise a series of the wire batches 22 which, as shown in FIG. 3, are mutually spaced around at least one first circular line 26 surrounding a circumference 28 of the flow conduit 6. Each wire batch 22 comprises a plurality of the electrically conductive wires 10 crossing the first plane P in a direction orthogonal to the first plane P.

There are 2K wire batches 22 in each of the first and second coils 14, 16 and 4K wire batches 22 in total in the first and second coils 14, 16, and preferably in the entire coil system 8.

The wire batches 22 of the first coil 14 are located within the angular range $0<\theta<180°$ and the wire batches 22 of the second coil 16 are located within the angular range $180<\theta<360°$, wherein the angle $\theta$ is defined as an angle relative to the x axis in the positive direction whereby the angle $\theta$ is 0° along the positive x axis and 180° along the negative x axis.

For the wire batches 22 of the first coil 14, the respective values of the index k are non-sequential with increasing angle $\theta$ within the angular range $0<\theta<180°$ and for the wire batches 22 of the second coil 16 the respective values of the index k are non-sequential with increasing angle $\theta$ within the angular range $180<\theta<360°$.

In particular, for the wire batches 22 of the first coil 14, the value of the index k is 1 for the wire batch 22 having the lowest value of angle $\theta$ within the angular range $0<\theta<180°$. The index k increases sequentially to a value of k=n with increasing values of angle $\theta$ within the angular range $0<\theta<90°$. The value of the index k is n+1 for the wire batch 22 having the highest value of angle $\theta$ within the angular range $0<\theta<180°$. The index k increases sequentially to a value of k=m with decreasing values of angle $\theta$ within the angular range $180<\theta<90°$.

Furthermore, for the wire batches 22 of the second coil 16, the value of the index k is m+1 for the wire batch 22 having the lowest value of angle $\theta$ within the angular range $180<\theta<360°$. The index k increases sequentially to a value of k=p with increasing values of angle $\theta$ within the angular range $180<\theta<270°$. The value of the index k is p+1 for the wire batch 22 having the highest value of angle $\theta$ within the angular range $180<\theta<360°$. The index k increases sequentially to a value of k=q with decreasing values of angle $\theta$ within the angular range $270<\theta<360°$. The index k thereby varies from 1 to q within the angular range $0<\theta<360°$.

The wire batches 22 in each of the respective first and second coils 14, 16 are mutually separated by an angle $\Delta\theta$ from the wire batches 22 of adjacent sub-coils 18, 20 in the respective first and second coils 14, 16. The angle $\Delta\theta$ may be constant within the first coil 14 and constant within the second coil 14, and optionally the same value within both the first coil 14 and the second coil 14. In other words, for the first coil 14, in the quadrant a within the angular range $0<\theta<90°$ angle $\Delta\theta$ may be constant and the same value of angle $\Delta\theta$ may be present in the quadrant b within the angular range $180<\theta<90°$. Preferably, the same angular configuration is present in the second coil 16, for quadrant c for the angular range $180<\theta<270°$ and quadrant d for the angular range $270<\theta<360°$, and most preferably with the same value of angle $\Delta\theta$ as in the first coil 14. However, in alternative embodiments, the angle $\Delta\theta$ may be non-uniform in the coil system 8.

In the illustrated embodiment, the angle $\Delta\theta$ is constant and in each of the respective first and second coils 14, 16 the number of sub-coils K and the angle $\Delta\theta$ have the relationship $(K-0.5)\Delta\theta<90°$. In the illustrated embodiment, the wire batches 22 of the first coil 14 are located within the angular range (Δθ/2) to (180−Δθ/2)° and the wire batches 22 of the second coil 16 are located within the angular range (180+Δθ/2) to (360−Δθ/2)°.

In the first coil 14, the wire batches 22 in the sub-coil 18 located closest to the y axis, the wire batches 22 being on respective opposite sides of the y-axis, are located at the angular positions $\theta_a=(K-0.5)\Delta\theta°$ and $\theta_b=180-((K-0.5)\Delta\theta)°$ where $\theta_a$ is the angular position of the wire batch 22 when x and y are positive and Ob is the angular position of the wire batch 22 when x is negative and y is positive.

In the second coil 16, the wire batches 22 in the sub-coil 20 located closest to the y axis, the wire batches 22 being on respective opposite sides of the y-axis, are located at the angular positions $\theta_c=180+((K-0.5)\Delta\theta)°$ and $\theta_d=360-((K-0.5)\Delta\theta)°$ where $\theta_c$ is the angular position of the wire batch 22 when x and y are negative and $\theta_d$ is the angular position of the wire batch 22 when x is positive and y is negative.

In the illustrated embodiment, the angle Δθ is constant and Δθ=360/4K. Typically, Δθ is from 1 to 60°, more typically from 10 to 20°, yet more typically from 10 to 15°, for example 11.25°.

In one preferred embodiment as shown in FIG. 3, the apparatus comprises eight wire batches 22 per quadrant giving a total of thirty two wire batches 22 when viewed in cross section and for such a configuration a particularly useful angular spacing Δθ between consecutive cosine coil wire batches 22 is 11.25°. Such a configuration would typically comprise sixteen electrodes 12 in the EVT apparatus, the electrodes being positioned at angular intervals of 22.5° with the first electrode (e1) being located at an angular position of 0° with respect to the increasing x-axis. For the system shown in FIG. 3, and for sixteen electrodes 12, the electrodes 12 are present in the first quadrant, quadrant a, at angular positions of 0, 22.5, 45, 67.5 and 90°. Setting Δθ=11.25° for the wire batches 22 means that the electrodes 12 are all positioned equidistant between pairs of wire batches 22. This allows signal cables 54, which carry flow induced voltage signals from the electrodes 12 to the signal processing circuitry 58 illustrated in FIG. 1, to be readily passed through the mid-points of the gaps 13 between pairs of wire batches 22. Consequently, with a wire batch separation of 11.25°, for quadrant a signal cables 54 connected to the respective electrodes 12 pass between the wire batches, and in FIG. 3 between wires batches having k=25 and k=1, k=2 and k=3, k=4 and k=5, k=6 and k=7 and k=8 and k=16. A similar arrangement applies for the location of the electrodes 12 and signal cables 54 in the remaining quadrants b, c and d.

This construction is very advantageous because (in all but the two isolated cases described below) the magnitude of the local magnetic flux density in the spaces between consecutive wire batches 22 is relatively low. This in turn means that quadrature noise, inductively coupled into the signal cables 54 due to the alternating magnetic fields between the wire batches 22, is minimised. If the wire batches 22 were arranged differently it is probable that some of the signal cables 54 from the electrodes 12 would have to pass directly through the wire batches 22 where the local magnetic flux density is much higher and this would significantly increase the amplitude of the quadrature noise inductively coupled into the signal cables 54.

Exceptions to the cases described above occur for the signal cables 54 from the electrodes 12 located at θ=0° (electrode 'e1') and θ=180° (electrode 'e9') when the cosine coils are used in the "non-uniform magnetic field" configuration. In this configuration, electrical current flows in opposite directions in the wire batches 22 on either side of both e1 and e9, and this results in relatively high magnetic flux density (at frequency $f_2$, as described above) in the gaps 13 through which the associated signal cables 54 must pass.

However, it should be noted that, provided the signal cables 54 leading from electrodes e1 and e9 are both routed parallel to the x-axis as they pass through the gaps 13 in the wire batches 22, they will also be parallel to the local direction of the magnetic flux associated with the non-uniform magnetic field. As a consequence, the quadrature noise which is inductively coupled into the signal cables 54 from e1 and e9, due to the non-uniform magnetic field in the gaps 13 between the wire batches 22 through which these signal cables 54 must pass, is relatively low. This is because inductive coupling is most efficient when the local magnetic flux is normal to a cable and its associated cable loop but drops to zero when the local magnetic flux is parallel to the cable and its associated cable loop.

Thus, for a sixteen electrode EVT system, it is advantageous to use an angular spacing Δθ between consecutive wire batches 22 of the cosine coils which is close, or equal to, 11.25°. This is because, for both the "uniform" and "non-uniform" magnetic field configurations, inductively coupled quadrature noise will be minimised for all of the sixteen signal cables leading from the electrodes 12 to the signal processing circuitry 58.

However, it should be noted that in the embodiment of FIGS. 1 and 2 the electrodes 12 are located equidistantly around the flow conduit 6 and there is no mathematical relationship between the spacing between the (sixteen) electrodes 12 and the spacing between the (twelve) wire batches 22.

The homogeneity of the "uniform magnetic field" flux density distribution is progressively improved as the angular separation Δθ between consecutive wire batches 22 is progressively reduced. However for EVT applications there is typically a practical minimum value for JO of about 10° below which cosine coil systems may become difficult to manufacture, particularly for relatively low values of the flow channel radius $R_{ch}$. It is also preferred, to attain sufficient homogeneity of the "uniform magnetic field" for EVT applications, that the Δθ values are not greater than 20°.

If the angular separation between the wire batches 22 in the ranges $\theta_d$ to $\theta_a$ and $\theta_b$ to $\theta_c$ is not constant, the homogeneity of the flux density distribution in the "uniform magnetic field" configuration is worsened. Therefore a constant angle Δθ is preferred. In the preferred embodiments of the cosine coil systems described below, the angular batch separation Δθ in the ranges $\theta_d$ to $\theta_a$ and $\theta_b$ to $\theta_c$ is kept constant.

The wire batches 22 of the first coil 14 and the wire batches 22 of the second coil 16 are symmetrical about a z-direction plane comprising the x-axis and a z-axis orthogonal to the x-axis and to the y-axis.

By providing these positions for the batches in the first and second coils 14, 16, the optimum homogeneity of the magnetic flux density distribution in the "uniform magnetic field" configuration is achieved. The parameter of K is chosen such that the value of the product (K−0.5)×Δθ is as close as possible to 90° but less than 90°. The angular batch separation Δθ is preferably preserved across the junctions between the first and second coils 14, 16 because the angular positions (with respect to the increasing x-axis) of the batches 22 at the extremities of the first coil 14 are 0.5×Δθ and 180°−0.5×Δθ whilst the angular positions (with respect to the increasing x-axis) of the batches 22 at the extremities of the second coil 16 are 180°+0.5×Δθ and 360°−0.5×Δθ.

In accordance with the present invention, a geometrical centre of the $k^{th}$ wire batch 22 subtends an angle $\theta_k$, and each $k^{th}$ wire batch comprises $N_k$ wires and $N_k$ is proportional to $|\cos \theta_k|$. In other words, the present invention provides a "cosine coils" configuration.

Preferably, in the illustrated embodiment, the number $N_k$ of wires in the $k^{th}$ wire batch is given by:

$N_k = N_{TOT}(\cos \theta_k)/S$ when x and y are positive and k=1 to K;

$N_k = N_{k-K}$ when x is negative and y is positive and k=K+1 to 2K;

$N_k = N_{k-2K}$ when x is negative and y is negative and k=2K+1 to 3K; and $N_k = N_{k-3K}$ when x is positive and y is negative and k=3K+1 to 4K;

where $N_{TOT}$ is a total number of wires in the first and second coils and $S = \Sigma_{k=1}^{K} \cos \theta_k$.

Typically, in each $k^{th}$ wire batch 22, $N_k = \rho \hat{A}_k \hat{B}_k$ where $\rho$ is the packing density of wires 10 in the plurality of wire batches 22. Preferably, the packing density p has a range of from $2.5 \times 10^5$ to $6.5 \times 10^6$ m$^{-2}$.

For the cosine coil system used in the apparatus of the preferred embodiments of the present invention, to be capable of generating homogeneous magnetic fields in the "uniform field" configuration, $N_k$ is proportional to $|\cos \theta_k|$.

In an EVT application, in order to generate the uniform magnetic field, the first and second coils are driven in a "uniform magnetic field" configuration whereby electrical current flows in the same direction in both the first (e.g. upper) and second (e.g. lower) coils 14, 16. In order to generate the non-uniform magnetic field required for EVT, the coils 14, 16 are driven in a "non-uniform magnetic field" configuration, with the electrical current flowing in opposite directions in the first (e.g. upper) and second (e.g. lower) coils 14, 16. The currents for the uniform and non-uniform magnetic fields may be arranged to flow simultaneously in the first (e.g. upper) and second (e.g. lower) coils 14, 16 but at distinct respective frequencies $f_1$ and $f_2$, thereby allowing the flow induced electrical potentials associated with these different magnetic fields to be distinguished from each other.

Historically, a non-uniform magnetic field has been generated by flowing electrical current in opposite directions in two coils (such as are found in a Helmholtz coil) arranged symmetrically about the x-z plane. Consequently, for EVT applications, the cosine coil arrangement comprises a first (e.g. upper) coil 14 and a second (e.g. lower) lower coil. When viewed in cross-section the first (e.g. upper) coil 14 comprises 2K batches 22 of wires with the number of wires in a given batch 22 being proportional to the magnitude of the cosine of the angle which that batch 22 subtends with the increasing x-axis. With reference to FIG. 3, the 'first' wire batch 22 in the first coil 14 subtends an angle $0.5 \times \Delta \theta$ with the increasing x-axis whilst the 'last' batch 22 in the first coil 14 subtends an angle of $0.5 \times \Delta \theta$ with the decreasing x-axis, where $\Delta \theta$ is the angular spacing between consecutive batches 22 as described above.

Again, with reference to FIG. 3, the second (e.g. lower) coil 16 is symmetrical to the first (e.g. upper) coil 16 about the x-z plane. The 'first' batch 22 in the second coil 16 subtends an angle of $-0.5 \times \Delta \theta$ with the increasing x-axis and the 'last' batch in the second coil 16 subtends an angle of $-0.5 \times \Delta \theta$ with the decreasing x-axis.

It can therefore be seen that the cosine coil arrangement for EVT applications in accordance with the present invention, when viewed in cross-section, contains no wire batches 22 at angular positions 0° and 180° relative to the increasing x-axis and this is a major departure from a conventional cosine coil configuration.

Each wire batch 22 forms a polygonal cross-section at the first plane P. Typically, each wire batch 22 forms a rectangular or square cross-section at the first plane 22.

Although the preferred embodiments as described in detail hereinbelow comprises cosine coils formed by wire batches 22 which are rectangular in cross section, the preferred parameters also described below are also applicable to cosine coils with wire batches of any cross sectional shape, including circular cross section wire batches and 'wedge-shaped' cross section wire batches.

When the wire batch 22 forms a rectangular or square cross-section, each $k^{th}$ wire batch 22 has a width $\hat{A}_k$ in a direction tangential to the circular line and a height $\hat{B}_k$ in a radial direction from the origin, and the aspect ratio $\beta$ of the wire batches 22 is defined as $$\beta = \frac{\hat{B}_k}{\hat{A}_k}.$$

Typically, the aspect ratio $\beta$ of the wire batches 22 is constant for all values of k. However, in some alternative embodiments, the aspect ratio $\beta$ of the wire batches 22 varies and is thereby not constant for all values of k. Preferably, the aspect ratio $\beta$ of the wire batches 22 is constant for all batches and within the range $0.5 \leq \beta \leq 4$. In the illustrated embodiment, the height $\hat{B}_k$ is greater than the width $\hat{A}_k$ in each wire batch 22 whereby the aspect ratio $\beta$ of the wire batches 22 is greater than 1.

In the preferred embodiments of the present invention, the most homogeneous "uniform" magnetic field is achieved when the aspect ratio $\beta$ of the cross-sections of the wire batches 22 is equal to 1. However, if the values of $\hat{A}_k$ are held constant for fixed k, and if it is required to increase the value of $B_u$, for example to enable lower flow velocities to be measurable using the EVT system, this can readily be achieved by increasing the aspect ratio $\beta$ of the rectangular cross-section wire batches 22.

The present inventors have unexpectedly found that when $\beta$ is the same for all wire batches then, by increasing the value of $\beta$, the homogeneity of the "uniform" magnetic field is not seriously compromised. For example, when $\beta=1$, the magnitude $B_u$ of the uniform magnetic field within the flow conduit 6 typically varies by a maximum of about +/−0.14% of its mean value. For the much higher $\beta$ value of 4, $B_u$ only varies by a maximum of about +/−0.44% of its mean value in the flow conduit 6, which is still acceptable for EVT applications. Indeed, it has been found unexpectedly by the present inventors that the aspect ratio $\beta$ of the rectangular cross-section wire batches 22, when the same value for all wire batches, may be changed in the range $0.5 \leq \beta \leq 4$ without the homogeneity of the "uniform" magnetic field flux density distribution becoming unacceptable for EVT applications. For some applications and configurations, an even higher value of the aspect ratio $\beta$ may provide an acceptable homogeneity of the "uniform" magnetic field flux density distribution.

The geometrical centres of the wire batches 22 of the first coil 14 and the wire batches 22 of the second coil 16 are at a radial distance $R_{bc}$ from the origin O located at the geometrical centre of the cross-section of the flow conduit 6, wherein $R_{bc}$ is greater than an internal radius $R_{ch}$ of the flow conduit 6.

For the cosine coil system used in the apparatus of the preferred embodiments of the present invention, the aspect ratio β of the rectangular cross section wire batches 22 is kept constant for all values of k for any given cosine coil system, although the value of β may vary from apparatus to apparatus. Furthermore, for a given apparatus, the geometric centres of the rectangles forming the cross-sections of the wire batches 22 preferably all lie on a so-called 'Batch Circle' of radius $R_{bc}$, in order to achieve the best "uniform field" homogeneity. The radius $R_{bc}$ is related to, but always greater than, the flow channel radius $R_{ch}$.

For a given value of $R_{ch}$, and for a given value of the amplitude $I_2$ of the electrical current which flows in each of the upper and lower coils at frequency $f_2$, the amplitude $B_{op}$ of the reference magnetic flux density associated with the non-uniform magnetic field increases as the total number $N_{TOT}$ of wires in each of the upper and lower coils is increased, according to the following equation:

$$B_{op} = \frac{k_{1,op,\beta} N_{TOT} I_2}{R_{ch}}$$

where $k_{l,op,\beta}$ represents the "non-uniform field" efficiency parameter associated with rectangular cross section wire batches of aspect ratio β, and $k_{l,op,\beta}$ is a function of β of the form:

$$k_{l,op,\beta} = \lambda_{op} \exp(-\mu_{op}\beta).$$

The "non-uniform field" efficiency parameter $k_{l,op,\beta}$, decreases relatively slowly as β is decreased. Therefore, provided the values of $\hat{A}_k$ are held constant (for fixed k), if it is required to increase $B_{op}$ this can readily be achieved by increasing the aspect ratio β of the rectangular cross section wire batches.

As β is varied in the range 0.5≤β≤4, the value of $k_{l,op,\beta}$ typically changes from about $2.43 \times 10^{-3}$ GmA$^{-1}$ to about $1.72 \times 10^{-3}$ GmA$^{-1}$. These values for the "non-uniform field" efficiency parameter are significantly higher than for the known Helmholtz coil systems which were driven in an 'anti-Helmholtz' configuration (i.e. the electrical current was driven in opposite directions in the upper and lower coils) had "non-uniform field" efficiency parameters of only $5.47 \times 10^{-4}$ GmA$^{-1}$ and $1.08 \times 10^{-3}$ GmA$^{-1}$ for EMFMs with $R_{ch}$ values of 0.025 m and 0.04 m respectively. Thus the efficiencies of the cosine coil systems according to the preferred embodiments of the present invention for generating non-uniform magnetic fields with high amplitude flux densities, are significantly greater than the efficiencies of the known Helmholtz coil systems.

In the illustrated embodiment, the radial distance $R_{bc}$ is a common radial distance $R_{bc}$ for the wire batches 22 of the first coil 14 and the wire batches 22 of the second coil 16.

However, in alternative embodiments, the radial distance $R_{bc}$ for the wire batches 22 may vary. For example, the wire batches 22 may have different radii from the origin O.

In the illustrated embodiment, the geometric centre O of the cosine coil system coincides with the geometric centre of the flow pipe. In the "uniform magnetic field" configuration, the magnetic field contained within this circle is most homogeneous for small values of r but becomes less homogeneous as r approaches the radius $R_{bc}$, of the 'Batch Circle'. It is therefore preferred that that the flow channel radius $R_{ch}$ is 'significantly' less than the batch circle radius $R_{bc}$, in order to achieve good homogeneity of the 'uniform' magnetic field within the flow channel.

In the illustrated embodiment, the radial distance $R_{bc}$ and the internal radius $R_{ch}$ of the flow conduit 6 have the relationship 1.345 $R_{ch} \leq R_{bc} \leq$ 1.66 $R_{ch}$. Using a value of $R_{bc}$ in this range thus provides additional homogenisation to the uniform magnetic field. Typically, the radial distance $R_{bc}$ is from 16.8 to 830 mm and the internal radius $R_{ch}$ of the flow conduit 6 is from 12.5 to 500 mm.

It should be noted that, for any given value of $R_{ch}$ in the "uniform magnetic field configuration", the optimum magnetic field homogeneity within the flow channel will be achieved when β=1. As β is increased beyond this value, the homogeneity of the 'uniform' magnetic field within the flow channel will tend to worsen. However, this effect is offset to a certain extent by the fact that as β is increased $R_{bc}$, will increase. As $R_{bc}$, is increased, the homogeneity of the 'uniform magnetic field' inside the fixed flow channel radius $R_{ch}$ will improve. It is for this reason that, for the cosine coils designs presented in this document, good magnetic field homogeneity for the "uniform magnetic field" configuration can be maintained for the relatively wide range of values of β described above (i.e. 0.5≤β≤4).

In the illustrated embodiment of FIG. 3, the relationship between $R_{bc}$ and $R_{ch}$ can be expressed as $$R_{bc} = \gamma R_{ch}(1 + 0.5\beta\alpha_1)$$

where β is the aspect ratio of the rectangular cross section wire batches and where γ and $\alpha_1$ are constants which define the geometry of the cosine coil system and which have typical values of 1.3 and 0.13846 respectively. For the definitions of γ and $\alpha_1$, $$\gamma = \frac{R_{elec}}{R_{ch}}$$

where $R_{ch}$ is the flow channel radius and $R_{elec}$ is the maximum radius to which the electrode bodies protrude (excluding connecting wires) as shown in FIG. 3, and $$\alpha_1 = \frac{\hat{A}_1}{R_{elec}}$$

where $\hat{A}_1$ is the base width of the rectangular cross section batch for which k=1.

For a given flow channel radius $R_{ch}$ and a given number $N_{TOT}$ of wires in each of the upper and lower coils, the outer diameter of the overall cosine coil system can be reduced: (a) by reducing the value of γ and hence reducing the batch circle radius $R_{bc}$ or: (b) by increasing $\alpha_1$. Increasing $\alpha_1$ allows more wires in each batch to be placed at locations with a lower value of the radial coordinate r and hence allows the batch aspect ratio 3 to be reduced. A typical lower limit for the value of γ is about 1.2 and, when using this value of γ, a typical upper limit for the value of $\alpha_1$ is about 0.17. However, using a relatively low value for γ and a relatively high value for $\alpha_1$ as described above, may result in the wire batches being placed very close to each other and this, in turn, may cause difficulties in manufacturing a support system for the cosine coils which has sufficient structural strength. It is possible to overcome this limitation somewhat by increasing the angular spacing Δθ between adjacent wire batches; however, this would result in a worsening of the homogeneity of the uniform magnetic field.

In the illustrated embodiment, each wire batch 22 has a linear portion 30 which extends orthogonal to the first plane P for a length L, and the linear portion 30 has a centre 32 located at the first plane P, whereby equal lengths of the linear portion 30 are on opposite sides of the first plane P.

Preferably, the length L of the linear portion 30 and an internal radius $R_{ch}$ of the flow conduit 6 have the relationship $4R_{ch} \leq L \leq 10R_{ch}$, optionally $4R_{ch} \leq L \leq 8R_{ch}$. Typically, the length L is from 50 to 4000 mm and the internal radius $R_{ch}$ of the flow conduit is from 12.5 to 500 mm.

For EVT applications, in the preferred embodiments of the present invention, the z-axis of each cosine coil co-ordinate system is coincident with the axis of the flow conduit 6. The EVT electrode array is located at the x-y plane where z=0. The cosine coils extend from z=−0.5 L to z=+0.5 L in the axial direction giving an overall axial length L which should be large enough to ensure (a) that the 'uniform' magnetic field which are generated by the cosine coils is fully one-dimensional, with minimal variation in the z-direction, for z in the range$-2R_{ch} \leq -z \leq 2R_{ch}$; and (b) that the 'non-uniform' magnetic field which is generated by the cosine coils is fully two-dimensional, with minimal variation in the z-direction, for z in the range $-2R_{ch} \leq z \leq 2R_{ch}$. To ensure that the above conditions are met, preferably L should be in the range $4R_{ch} \leq L \leq 8R_{ch}$.

In order to minimise 'end effects' on the uniform and non-uniform magnetic fields, the wires forming the upper and lower coils should only loop back over the flow conduit 6 at axial positions for which z≤−0.5 L or z≥0.5 L. Furthermore, the regions where the coil wires loop back over the flow pipe should be shielded from the region where −0.5 L≤z≤0.5 L using a magnetic shielding material such as mu-metal.

In the illustrated embodiment, the linear portion 30 has opposite ends 32, 34 and each wire batch 22 has opposite non-linear portions 36, 38 connected to, and extending away from, in an outwardly direction relative to the flow conduit 6, the respective opposite ends 32, 34. The apparatus preferably further comprises a magnetic shielding material 40 between the non-linear portions 36, 38 and the flow conduit 6.

In the illustrated embodiment, the apparatus further comprises a support 42 surrounding the pipe 4. The support 42 has a series of mutually spaced slots 44 extending around the first circular line 26 surrounding the circumference 28 of the flow conduit 6. Each wire batch 22 is located in a respective slot 44. The support 42 may comprise a single elongate support for both of the first and second coils 14, 16 extending along the longitudinal axis L-L. Alternatively, the support 42 may comprise a plurality of spaced support members which are mutually spaced along the longitudinal axis L-L. For example, the support 42 may comprise a pair of opposite 'end supports' and one or more 'intermediate supports'.

Preferably, each slot 44 has a cross-section having an internal shape and dimensions at the first plane P which corresponds to the cross-section of the external shape and dimensions of the respective wire batch 22 located in the respective slot 44.

Typically, each slot 44 is a blind channel 46 having an opening 48 at a radially outer side 50 of the slot 44. In the preferred embodiments, the support 42 is composed of a material which permits transmission therethrough of electromagnetic fields emitted from the wire batches 22 when electrical current is passed through the wire batches 22.

In the preferred embodiments of the present invention, the rectangular cross-section wire batches 22 are constrained to reside within rectangular shaped slots 44 which are machined into the support 42 for the cosine coils. The width of the $k^{th}$ slot 44 is preferably slightly greater than $\hat{A}_k$ whilst the depth of the $k^{th}$ slot 44 is dependent upon $R_{bc}$, $\hat{B}_k$ and the outer radius of the support 44. It should be noted that the machined slots 44 are open at the radially outermost opening 48 to facilitate the winding of the cosine coils.

The slots 44 that are cut into the support 42 for the cosine coils are long enough, in the approximate radial direction, to accommodate the wire batches 22. This means that two different EMFMs of the same geometric type and with the same flow channel radius $R_{ch}$ but with different values for the batch aspect ratio β are provided with slots 44 of different lengths. This in turn means that the outer diameters of the supports would be different for the two EMFMs, even though the EMFMs are of the same geometric type and have the same flow channel radius.

In the illustrated embodiment, the array of electrodes 12 comprises a series of mutually spaced electrodes 12 extending around at least one second circular line 52 surrounding the circumference 28 of the flow conduit 6. The electrodes 12 are located in the first plane P. Typically, each of the electrodes 12 is located equidistant, and in the gap 13, between a respective pair of the wire batches 22. However, as described above in the embodiment of FIG. 3 the electrodes 12 are located only between some pairs of the wire batches 22 and in the embodiment of FIGS. 1 and 2 the electrodes are equally spaced around the circumference and are not located in gaps between the wire batches 22.

Preferably, each of the electrodes 12 is connected to an electrically conductive signal cable 54 extending radially away from the flow conduit 6. A portion 56 of the signal cable 54 adjacent to the respective electrode 12 extends between the respective adjacent wire batches 12. In the preferred embodiment, each portion 56 of the signal cable 54 adjacent to the respective electrode 12 extends equidistant between the respective adjacent wire batches 22.

In the illustrated embodiment, the electrodes 12 are electrically connected to signal processing circuitry 58 which is arranged to receive flow induced voltage signals from the electrodes 12.

In the method of monitoring a multiphase flow in a pipe using magnetic induction tomography, there is provided a pipe 4 defining the flow conduit 6, and the first and second coils 10, 12 disposed on the respective opposite first and second sides 14, 16 of the pipe 4 but those skilled in the art will appreciate that more coils could be used to provide more measurements across the pipe 4.

In order to minimise distortion of the uniform and non-uniform magnetic fields generated by the cosine coil system caused (a) from magnetic fields generated by eddy currents and (b) from fields generated by magnetic materials, both the pipe and the structure supporting the cosine coil wires should be made from non-electrically conducting, non-magnetic materials. However, it may be preferred to clad the coil 'end supports' (where the coils lop back over the flow tube) with a thin layer of high permeability material (such as mu-metal) in order to minimise 'end effects' on the designed magnetic fields. It is also preferred that the cosine coil system may include a thin outer shield of circular cross section made from high permeability material (such as mu-metal) in order to prevent magnetic flux from the cosine coil system from interfering with other nearby systems, and vice versa. The design of any such shield is typically undertaken using appropriate 'electro-magnetics finite element' software (possibly in conjunction with physical experiments) with the objective of minimising distortion of the designed magnetic fields by the shield. The cosine coil configurations described herein have been designed on the assumption that all materials have a relative permeability equal to 1. Consequently, if it is required to incorporate any magnetic or electrically conducting materials into the cosine coil system, their effects on the uniform and non-uniform magnetic fields should be investigated either experimentally, or using finite element software, as mentioned above.

The present inventors have found that it is possible to use a cosine coil system to generate a uniform magnetic field in a flow conduit for which the maximum deviation of flux density in the flow cross-section, from the mean flux density in the flow cross section, is less than $1 \times 10^{-10}\%$ of the mean flux density in the flow cross-section.

The present inventors have also shown that the efficiency parameter $k_1$, referred to above, for a cosine coil system (when computed on a like-for-like basis for comparison with Helmholtz coils) can be as high as $5.24 \times 10^{-3}$ GmA$^{-1}$. This may be compared with a $k_1$ value of $1.94 \times 10^{-3}$ GmA$^{-1}$ which has been obtained for a Helmholtz coil used in an EVT application with a flow conduit of internal radius $R_{ch}$ equal to 0.025 m.

A further embodiment of the present invention is illustrated in FIGS. 5 to 10. This embodiment is similar to the embodiment so FIGS. 1 and 2.

In the further embodiment, the apparatus for monitoring a fluid flow in a pipe using electromagnetic velocity tomography (EVT) has a similar general structure, configuration and operation as the first embodiment; the geometrical shape of the first and second coils is again a "nested saddle-shaped" coil configuration. Like parts of the first and further embodiments are identified by like reference numerals and the common features of the first and further embodiments are not repeated in the following description.

In the further embodiment, fundamentally the feature in the first embodiment of the number of wires in each batch being associated with the cosine of the angle subtended by the batch relative to a coordinate system is also present.

In the 'nested saddle-shaped' cosine coil arrangement, the top and bottom coils each consist of K sub-coils whereby each sub-coil is 'saddle-shaped'.

Figure 5:
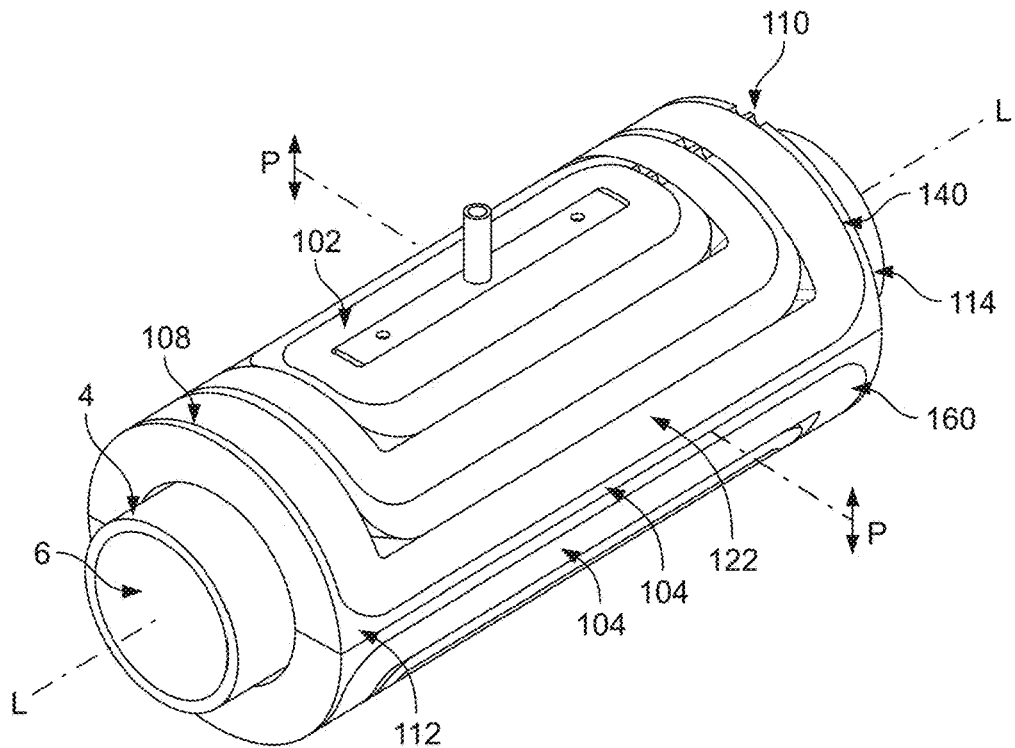
FIG. 5 is a schematic perspective view of a first (upper) and second (lower) saddle-shaped cosine coils in an apparatus for monitoring a fluid flow in a pipe using electromagnetic velocity tomography (EVT) in accordance with a further embodiment of the present invention.
Figure 6:
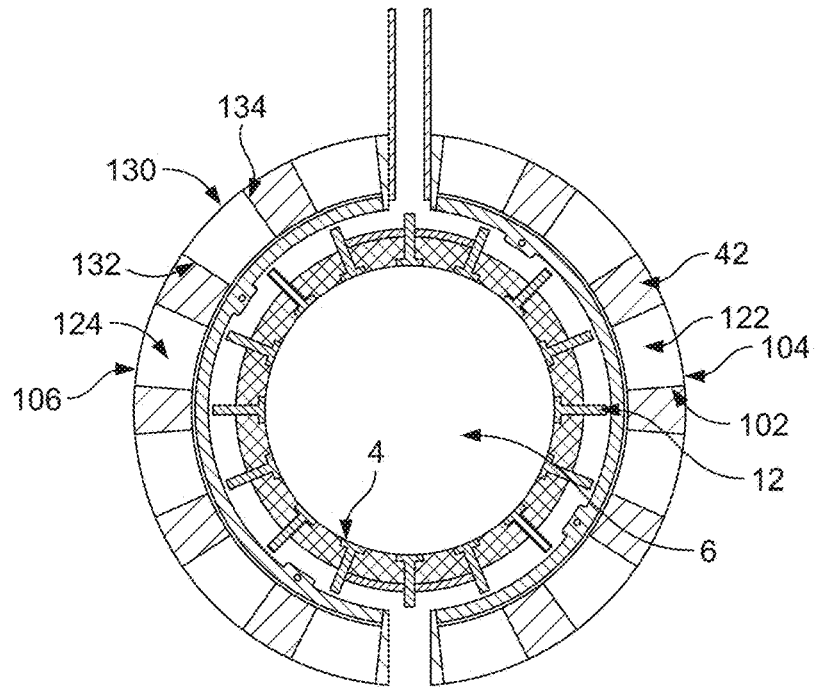
FIG. 6 is an enlarged schematic cross-section of first (upper) and second (lower) cosine coils in the apparatus of FIG. 5.
Figure 7:
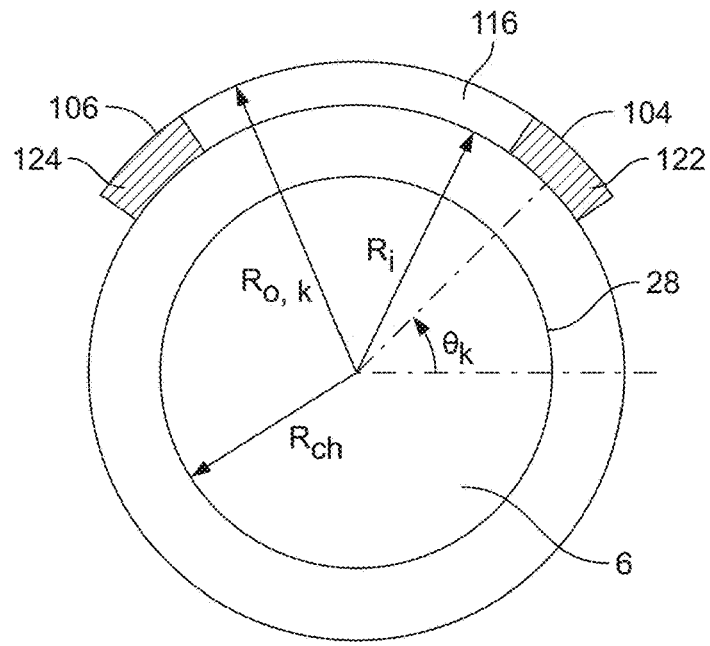
FIG. 7 is a schematic illustration of an end of a sub-coil in the apparatus of FIG. 5, the sub-coil being shown as an end view along the longitudinal axis of a flow conduit.
Figure 8:
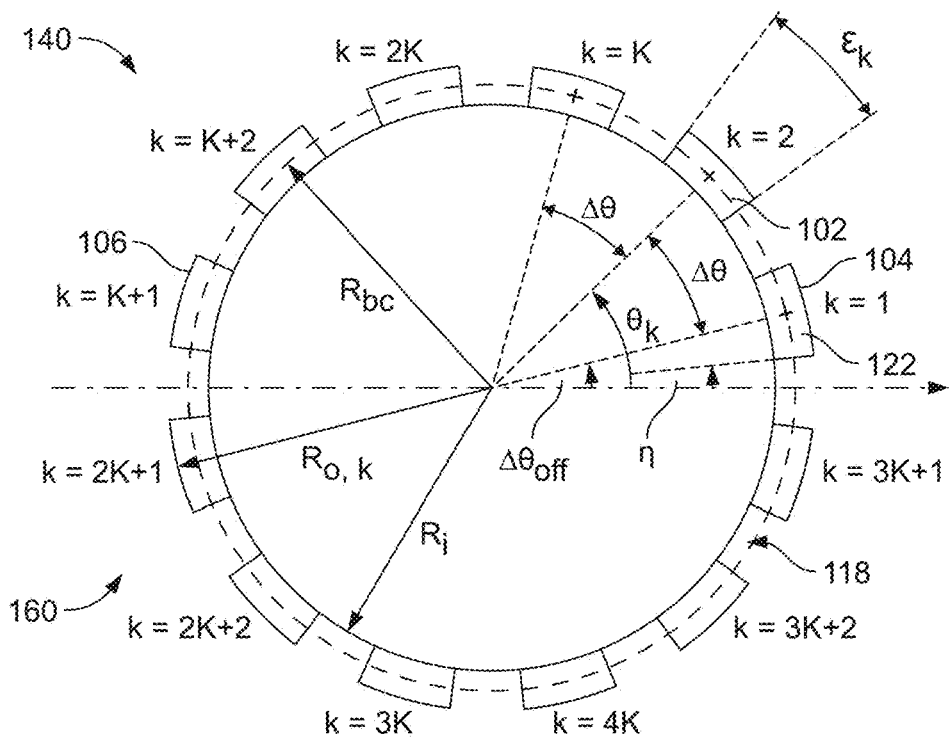
FIG. 8 is a cross-section orthogonal to the longitudinal axis of the flow conduit, and illustrates the location, in the coordinate system and relative to the origin thereof, of the wire batches of the sub-coils in the apparatus of FIG. 5.
Figure 9:
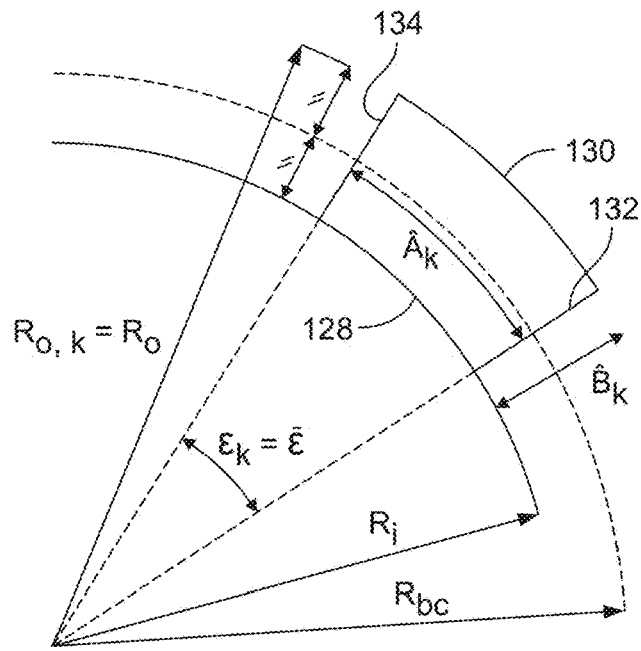
FIG. 9 is a cross-section orthogonal to the longitudinal axis of the flow conduit and illustrates the location, shape and configuration of a single wire batch in one of the sub-coils in the apparatus of FIG. 5.
Figure 10:
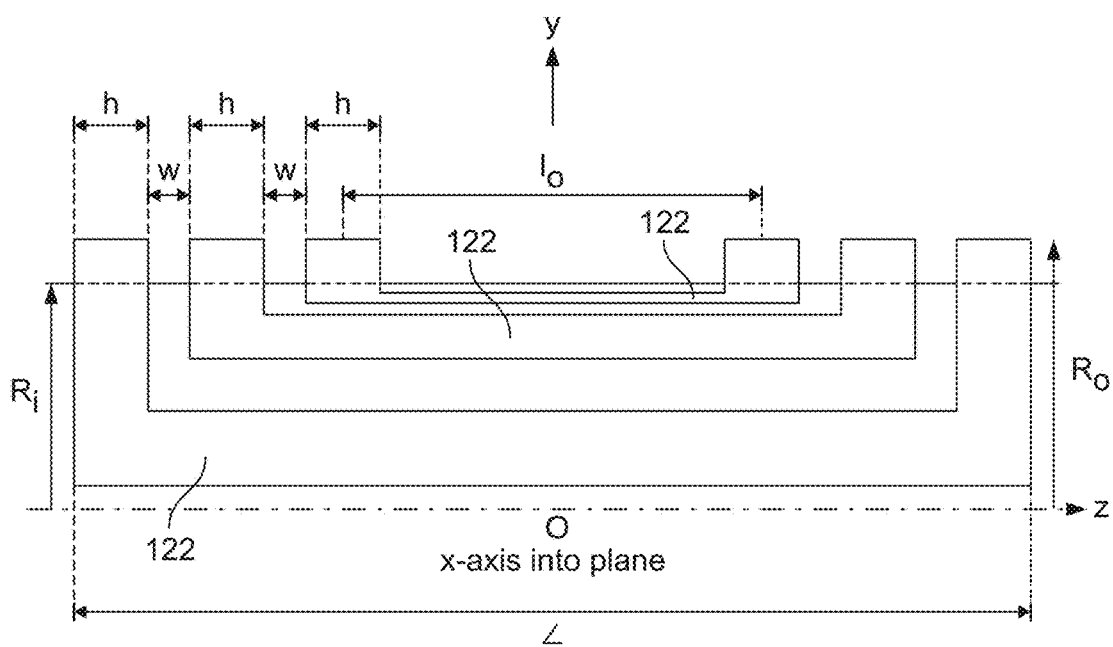
FIG. 10 is a side view, parallel to the longitudinal axis of the flow conduit, and illustrates the location, shape and configuration of the sub-coils of one of the coils in the apparatus of the FIG. 5.

FIG. 5 is a schematic perspective view of a first (upper) and second (lower) saddle-shaped cosine coils in an apparatus for monitoring a fluid flow in a pipe using electromagnetic velocity tomography (EVT) in accordance with a further embodiment of the present invention; FIG. 6 is an enlarged schematic cross-section of first (upper) and second (lower) cosine coils in the apparatus of FIG. 5; FIG. 7 is an end view along the longitudinal axis of the flow conduit and illustrates an end of a sub-coil; FIG. 8 is a cross-section orthogonal to the longitudinal axis of the flow conduit, and illustrates the location, in the coordinate system and relative to the origin thereof, of the wire batches of the sub-coils; FIG. 9 is a cross-section orthogonal to the longitudinal axis of the flow conduit and illustrates the location, shape and configuration of a single wire batch in one of the sub-coils; and FIG. 10 is a side view, parallel to the longitudinal axis of the flow conduit, and illustrates the location, shape and configuration of the sub-coils of one of the coils in the apparatus of the illustrated embodiment.

Referring to FIGS. 5 to 10, in the further embodiment, the first coil 140, and the second coil 160 each comprise a respective plurality of nested saddle-shaped sub-coils 102. Each sub-coil 102 comprises a pair of wire batches 122. The wire batches 122 of the first coil 140, and the wire batches 122 of the second coil 160 are symmetrical about a z-direction plane comprising the x-axis and a z-axis orthogonal to the x-axis and to the y-axis. Typically, geometrical centres of the wire batches 122 of the first coil 140 and the wire batches 122 of the second coil 160 are at a radial distance $R_{bc}$ from the origin O located at the geometrical centre of the cross-section of the flow conduit 6, wherein $R_{bc}$ is greater than an internal radius $R_{ch}$ of the flow conduit 6.

Preferably, the radial distance $R_{bc}$ is a common radial distance $R_{bc}$ for the wire batches 122 of the first coil 140 and the wire batches 122 of the second coil 160. Alternatively, the wire batches 140 may have different radial distance from the origin.

In the second embodiment, $l_0 \geq 4R_{ch}$, where $l_0$ is the mean axial length of the innermost sub-coil 102 of each of the first and second coils 140, 160 and $R_{ch}$ is the internal radius of the flow conduit 6.

Each saddle-shaped sub-coil 102 comprises two linear side portions 104, 106 symmetrically spaced on opposite sides of the y axis and extending parallel to the longitudinal direction L-L of the flow conduit 6. Each sub-coil 102 also comprises two end portions 108, 110, each end portion 108, 110 connecting the two linear side portions 104, 106 at a respective end 112, 114 of the side portions 104, 106. Each end portion 108, 110 is in the shape of an arc 116 of an annulus 118 surrounding the circumference 28 of the flow conduit 6. Each end portion 108, 110 is orthogonal to the longitudinal direction L-L of the flow conduit 6. Each wire batch 122 forms a cross-section at the first plane P which is in the shape of an arc 124 of an annulus 126 surrounding the circumference 28 of the flow conduit 6. The cross-section of each wire batch 122 at the first plane P is defined between inner and outer curved circumferential lines 128, 130 and opposite radial lines 132, 134.

In the second embodiment, $h \geq (R_o + R_i)\bar{\varepsilon}/360$, where h is the constant axial depth of each end portion 108, 110 of the sub-coils 102, the inner and outer radii of each sub-coil 102 are $R_i$ and $R_o$ respectively, and $\bar{\varepsilon}$ is a constant value of $\varepsilon_k$ and $\varepsilon_k$ is the angle in degrees subtended at the origin by the $k^{th}$ wire batch 122. Each end portion 108, 110 connects the pair of wire batches 122 of the respective sub-coil 102 at a respective end of the sub-coil 102 and the axial depth h is parallel to the longitudinal direction L-L of the flow conduit 6.

Unlike the cosine coil arrangements described above for the embodiment of FIG. 3, in order to achieve homogeneity of the uniform magnetic field it is preferred that: (a) the axial length of each saddle-shaped sub-coil 102 is specified and (b) the ends 112, 114 of each sub-coil 102, which both lie in a planes orthogonal to the longitudinal direction L-L of the flow conduit 6, are in the shape of an arc of a circular annulus when viewed along the longitudinal direction L-L of the flow conduit 6, as shown in FIG. 4.

As shown in FIG. 8, when viewed in cross-section at, for example, the plane of the electrode array the 2K sub-coils form 4K batches 122 of wires. Each wire batch 122 is designated with an index k which takes a value from 1 to 4K. As for the embodiment of FIG. 3, the values of k vary non-sequentially with angular position; instead k takes values as shown in FIG. 8, in which, in this embodiment, K is set equal to 3. The cross-sectional shape of each wire batch 122 is an arc of an annulus, with the geometric centre of every batch lying on a 'Batch Circle' having radius $R_{bc}$. The angle subtended at the pipe centre by the $k^{th}$ batch is denoted $\varepsilon_k$, as shown in FIGS. 8 and 9, and is expressed in angular units of degrees.

In the illustrated embodiment, each $k^{th}$ wire batch 122 has a mean width $\hat{A}_k$ in an azimuthal direction according to the formula: $\hat{A}_k = (2\pi R_{bc} \varepsilon_k)/360$, where $R_{bc}$ is the radius from the origin O to a geometrical centre of the $k^{th}$ wire batch 122 and $\varepsilon_k$ is the angle in degrees subtended at the origin O by the $k^{th}$ wire batch 122. The inner radius $R_i$ is the same for every batch 122. Each $k^{th}$ wire batch 122 has a height $\hat{B}_k$ in a radial direction from the origin O according to the formula: $\hat{B}_k = R_{o,k} - R_i$, where $R_{o,k}$ is the outer radius of the $k^{th}$ wire batch 122 from the origin O. For optimum homogeneity of the uniform magnetic field, $R_i$ should preferably be greater than or equal to $5.78 R_{ch}^{0.637}$ where $R_{ch}$ is the internal radius of the flow conduit 6.

The aspect ratio $\beta$ of the wire batches 122 is defined as $$\beta = \frac{\hat{B}_k}{\hat{A}_k}.$$

As for the preferred first embodiment, in this illustrated embodiment, the aspect ratio $\beta$ of the wire batches 122 is constant for all values of k. Preferably, the values of $\varepsilon_k$, $R_{bc}$ and $R_{o,k}$ are constant for all values of k. However, in alternative embodiments, the values of $\beta$, $\varepsilon_k$, $R_{bc}$ and $R_{o,k}$ may vary and are thereby not constant for all values of k.

As described herein above for the embodiment of FIG. 3, for given values of $\varepsilon_k$ the values of $\beta_k$ may be increased as the radius $R_{ch}$ of the flow conduit 6 is reduced in order to maintain the required flux densities of the uniform and non-uniform magnetic fields which are generated by the 'nested saddle' cosine coil arrangement.

In the illustrated embodiment of the 'nested saddle' cosine coil arrangement, $\varepsilon_k$ and $R_{o,k}$ are held constant for all k such that:

$\varepsilon_k = \bar{\varepsilon}$ ($k=1$ to $4K$) and $R_{o,k} = R_o$ ($k=1$ to $4K$).

Because $R_{bc}$ may be defined as $R_{bc} = 0.5 \times (R_o + R_i)$ it follows that the aspect ratio for every batch 122 is now constant and equal to p where:

$$\beta = \frac{(R_o - R_i)}{(R_o + R_i)} \times \frac{360}{\pi \bar{\varepsilon}}$$

In the illustrated embodiment, the angular position Ok of the geometrical centre of the $k^{th}$ wire batch 122 is given by:

$\theta_k = \Delta\theta_{off} + (k-1) \times \Delta\theta$ when x and y are positive and $k=1$ to K;

$\theta_k = 180° - \theta_{k-K}$ when x is negative and y is positive and $k = K+1$ to $2K$;

$\theta_k = 180° + \theta_{k-2K}$ when x is negative and y is negative and $k = 2K+1$ to $3K$; and $\theta_k = 360° - \theta_{k-3K}$ when x is positive and y is negative and $k = 3K+1$ to $4K$;

where $\Delta\theta$ is a constant angular separation between the geometrical centres of the wire batches 122 within a respective quadrant defined by the x and y axes, $\Delta\theta_{off}$ is an offset angle defined as $\Delta\theta_{off} = \eta + \bar{\varepsilon}/2$ where $\bar{\varepsilon}$ is a constant value of $\varepsilon_k$ and $\varepsilon_k$ is the angle in degrees subtended at the origin by the $k^{th}$ wire batch 122, and $\eta$ is a constant angle.

It should be noted that in order for the system to be readily physically realisable, preferably $\Delta\theta > \bar{\varepsilon}$.

The value of $\eta$ is typically set at about 5° to provide sufficient separation between the two adjacent batches 122 lying in the first and fourth quadrants and between the two adjacent batches 122 lying in the second and third quadrants. In order for a system, with K batches per quadrant and an angular separation $\Delta\theta$ between wire batches within a quadrant, to be physically realisable the following relationship applies, subject to the condition given in the previous equation ($\Delta\theta > \bar{\varepsilon}$):

$(K-1)\Delta\theta + \bar{\varepsilon} + \eta < 90°$

It should be noted from this equation that, for example, for a given value of K, several possible values of $\Delta\theta$, $\bar{\varepsilon}$ and $\eta$ are permissible.

Typically, $\eta$ is from 1 to 6°. Typically, K is from 2 to 9. Typically, $\Delta\theta$ is from 10 to 30°. Typically, $\bar{\varepsilon}$ is a constant value of $\varepsilon_k$ and is from 5 to 25°.

For the illustrated embodiment of the 'nested saddle' cosine coil arrangement, the following values have been selected (a) to provide good homogeneity of the uniform magnetic field and (b) to provide a non-uniform magnetic field with appropriate properties:

$K=3$; $\Delta\theta=30°$; $\bar{\varepsilon}=18°$ and $\eta=5°$.

It should be noted that for a 'nested saddle' cosine coil system to have optimum homogeneity of the uniform magnetic field then preferably:

$$\Delta\theta_{off} = \frac{\Delta\theta}{2}$$

subject to the condition $\Delta\theta > \bar{\varepsilon}$ given above. The condition that should then be met for a physically realisable system is as follows:

$(K-0.5)\Delta\theta + 0.5\bar{\varepsilon} < 90°$.

The total number of wires in each of the upper and lower coils is $N_{TOT}$. Relationships similar to those described above for the embodiment of FIG. 3 enable the appropriate value of $N_{TOT}$ to be determined in order to achieve the required flux densities of the uniform and non-uniform fields for a given value of $R_i$ and for given amplitudes $I_1$ and $I_2$ of the coil currents at frequencies $f_1$ and $f_2$ respectively—where $f_i$ is the frequency of the uniform magnetic field and $f_2$ is the frequency of the non-uniform magnetic field. Because the 'nested saddle coils' form a cosine coil system, the number $N_k$ of wires contained within the $k^{th}$ batch is given by the following relationships:

$N_k = \dfrac{\cos\theta_k}{S} \times N_{TOT}$  ($k = 1$ to $K$)
$N_k = N_{k-K}$  ($k = K+1$ to $2K$)
$N_k = N_{k-2K}$  ($k = 2K+1$ to $3K$)
$N_k = N_{k-3K}$  ($k = 3K+1$ to $4K$)

where $$S = \sum_{k=1}^{K} \cos\theta_k.$$

Because the cross-sectional area of each wire batch 122 is constant, the outer radius $R_o$ of each batch 122 is determined by the batches 122 containing the maximum number $N_{max}$ of wires. Since such batches 122 are associated with the indices k equal to $1, K+1, 2K+1$ and $3K+1$ it follows that $N_{max} = N_1 = N_{K+1} = N_{2K+1} = N_{3K+1}$ Accordingly, for the illustrated embodiment of the 'nested saddle' cosine coil system:

$$R_o = \left[\frac{360 \times N}{\pi \varepsilon \rho_1} + R_i^2\right]^{0.5}$$

where $R_i$ is calculated as defined above and where $\rho_1$ is the packing density of the wires in the batches with indices k equal to 1, K+1, 2K+1 and 3K+1. In the illustrated embodiment, typically the packing density in the batches for which k≠$N_1$ or $N_{K+1}$ or $N_{2K+1}$ or $N_{3K+1}$ will be lower than $\rho_1$ because smaller numbers of wires will be contained in cross-sectional areas of equal size to the batches with indices k equal to 1, K+1, 2K+1 and 3K+1. This suggests that for the batches for which k≠$N_1$ or $N_{K+1}$ or $N_{2K+1}$ or $N_{3K+1}$ larger diameter wires could be used, which would have the beneficial effect of decreasing the overall resistance of each of the upper and lower coils.

FIG. 10 shows a side view of the top coil of a 'nested saddle' cosine coil system. The lower coil is symmetrical to the upper coil about the x-z plane. The mean axial length of the innermost sub-coil is denoted $l_0$. For optimum homogeneity of the flux density of the uniform magnetic field generated by the 'nested saddle' cosine coil system $L_h$ should obey the following inequality:

$$l_0 \geq 4R_{ch}.$$

With reference to FIG. 10, the axial separation of the sub-coils is constant and denoted w whilst the axial depth of each end of every sub-coil is constant and denoted h. The inner and outer radii of the ends of each sub-coil are $R_i$ and $R_o$ respectively. Consequently, in order for the cross-sectional areas of the ends of each sub-coil to be large enough to contain all of the wires within the sub-coil then h should obey the following inequality $$h \geq \pi(R_o + R_i)\frac{\varepsilon}{360}$$

The minimum value of h given by this equation is appropriate for containing the wires in the sub-coils associated with wire batches which have indices k equal to 1, K+1, 2K+1 and 3K+1, assuming a packing density $\rho_1$. For other sub-coils, the axial depths of the sub-coil ends could be made smaller if required.

The overall axial length L of the 'nested saddle' cosine coil system is given by $$L = l_0 - w + 2K(w+h)$$

where K is the number of sub-coils in each of the top and bottom coils.

The present invention will now be described with reference to the following non-limiting Example.

EXAMPLE

As illustrated in FIG. 3, the cosine coil system comprises an upper and lower coil each with 16 wire batches giving a total of 32 wire batches. The wire batches in the upper coil are all contained within angular positions 0°<θ<180° with respect to the increasing x-axis. The wire batches in the lower coil are all contained within angular positions 180°<θ<360° with respect to the increasing x-axis.

The cross-section of each of the 32 wire batches is rectangular in shape. Each wire batch is shown as designated with an index k which takes values from 1 to 32 but it is important to note that the values of k do not vary sequentially with the angular positions of the batches. For the $k^{th}$ batch, the height of the rectangular cross section (in the approximate radial direction) is $\hat{B}_k$ and the base width of the rectangular cross section (in the approximate azimuthal direction) is $\hat{A}_k$.

The rectangular cross section of the $k^{th}$ batch has two bisectors: (i) a bisector parallel to the sides of length $\hat{B}_k$ which cuts the midpoints of the sides of length $\hat{A}_k$ and (ii) a bisector parallel to the sides of length $\hat{A}_k$ which cuts the midpoints of the sides of length $\hat{B}_k$. The geometric centre of the rectangle is defined as the intersection of these two bisectors. The geometric centre of the $k^{th}$ rectangle subtends an angle $\theta_k$ with the increasing x-axis. The values of $\theta_k$ for the 32 rectangular batches are defined below:

| | |
|---|---|
| $\theta_k = 5.5° + (k - 1) \times 11°$ | (k = 1 to 8) |
| $\theta_k = 180° - \theta_{k-8}$ | (k = 9 to 16) |
| $\theta_k = 180° + \theta_{k-16}$ | (k = 17 to 24) |
| $\theta_k = 360° - \theta_{k-24}$ | (k = 25 to 32) |

For the present example, it can be inferred from the equations above that the angular spacing Δθ between the consecutive cosine coil wire batches is 11° rather than the most preferred value of 11.25° described hereinabove for a 32 batch configuration. However because the value of Δθ used in this example is so close to 11.25°, the advantages associated with the use of a Δθ value of 11.25° are retained. Also, a Δθ value of 11° gives rise to a slightly more homogeneous 'uniform' magnetic field than a Δθ value of 11.25°.

A specific 'geometric type' of EMFM is geometrically similar to all other EMFMs of the same geometric type. This means that all EMFMs of the same geometric type have the same values of $\theta_k$ (k=1 to 32), γ and $\alpha_1$ where $$\gamma = \frac{R_{elec}}{R_{ch}}$$

where $R_{ch}$ is the flow channel radius as shown in FIG. 3, and where $$\alpha_1 = \frac{\hat{A}_1}{R_{elec}}$$

where $R_{elec}$ is, as shown in FIG. 3, the maximum radius to which the electrode bodies protrude (excluding connecting wires) and $\hat{A}_1$ is the base width of the rectangular cross section batch for which k=1.

In this example, the values for γ and $\alpha_1$ are 1.3 and 0.13846 respectively. These values are typical for cosine coil systems used in the present invention.

However, EMFMs of the same geometric type may have different values for the aspect ratio β associated with the wire batches of rectangular cross section, where $$\beta = \frac{\hat{B}_k}{\hat{A}_k} (k = 1 \text{ to } 32)$$

For a given, individual EMFM the same aspect ratio $\beta$ is the same for all wire batches.

Typically the flow channel radius $R_{ch}$ is in the range 0.025 m to 0.1 m.

The amplitude $I_1$ of the electrical current associated with the 'uniform' magnetic field that flows in each of the upper and lower coils at frequency $f_1$ depends at least partly on the current carrying capacity of the wire used for the coil windings, in particular its AWG rating (or equivalent). Typically, $I_1$ is in the range 0.25 A to 3 A.

The packing density $\rho$ for the selected coil wire is defined as $\rho = n_{w,max}/a$ where $n_{w,max}$ is the maximum number of wires that can 'comfortably' fit orthogonally through an aperture of cross sectional area a. A typical value of $\rho$, assuming for example the use of insulated AWG18 wire, is about $610 \times 10^3$ m$^{-2}$.

A geometrical constant S is calculated as follows:

$$S = \sum_{k=1}^{8} \cos\theta_k$$

The amplitude $B_u$ (in gauss) of the flux density (in the y direction) of the 'uniform' magnetic field generated by the cosine coils is selected to be sufficient to detect the electrically conductive phase of the specific application. The maximum flux density occurs when the maximum current $I_1$ flows in each of the upper and lower coils and in the same direction in each coil. After the value of $B_u$ has been selected, the equation below is used to determine the required value $\beta$ of the aspect ratio of the wire batches. The equation is used iteratively, with $\beta$ being adjusted at each iteration until the required value of $B_u$ is obtained.

$$B_u = [\beta\lambda\exp(-\mu\beta)] \times [I_1 R_{ch}] \times \left[\frac{\rho(\alpha_1\gamma)^2 S}{\cos\theta_1}\right]$$

The values of $\lambda$ and $\mu$ used in that equation are particular to the specific geometric type of EMFM under consideration, and must be found by mathematical modelling. The values for $\lambda$ and $\mu$ for the specific EMFM in the example are 0.0048 GmA$^{-1}$ and 0.0585 respectively. The equation is valid for $0.5 \leq \beta \leq 4$, and the closer the value of $\beta$ is to 1, the more homogeneous the 'uniform' field. For each value of $\beta$ that is used in the designs of different EVT EMFMs, a different set of weight values must be computed for the associated 'non-uniform' magnetic field. For this reason, it may be appropriate to use values of $\beta$ e.g. from 0.5 to 4 which are multiples of 0.5.

The total number $N_{TOT}$ of windings in each of the upper and lower coils is determined using $$N_{TOT} = \frac{\rho\beta(\alpha_1\gamma R_{ch})^2 S}{\cos\theta_1}$$

The total number of wires $N_k$ contained within the $k^{th}$ batch is calculated from:

$$N_k = \frac{\cos\theta_k}{S} \times N_{TOT} \quad (k = 1 \text{ to } 8)$$

| | |
|---|---|
| $N_k = N_{k-8}$ | ($k$ = 9 to 16) |
| $N_k = N_{k-16}$ | ($k$ = 17 to 24) |
| $N_k = N_{k-24}$ | ($k$ = 25 to 32) |

Since the number of wires in each batch must be a positive integer, the values of $N_k$ obtained using these equations are rounded up or down to the closest integer value.

Using the values of $\beta$ and $N_{TOT}$, the base widths $\hat{A}_k$ of the rectangular cross-section wire batches are:

| | |
|---|---|
| $\hat{A}_k = \left[\frac{\cos\theta_k}{S} \times N_{TOT} \times \frac{1}{\rho\beta}\right]^{0.5}$ | ($k$ = 1 to 8) |
| $\hat{A}_k = \hat{A}_{k-8}$ | ($k$ = 9 to 16) |
| $\hat{A}_k = \hat{A}_{k-16}$ | ($k$ = 17 to 24) |
| $\hat{A}_k = \hat{A}_{k-24}$ | ($k$ = 25 to 32) |

The rectangular cross section batch heights $\hat{B}_k$ are:

$\hat{B}_k = \beta\hat{A}_k$ ($k$ = 1 to 32)

The geometric centre of each rectangular cross-section wire batch lies on the so-called 'Batch Circle' which has radius $R_{bc}$ given by:

$$R_{bc} = \gamma R_{ch} + \frac{\hat{B}_1}{2}$$

The $k^{th}$ wire batch extends a distance of 0.5 $\hat{B}_k$ (in the approximate radial direction) on either side of the Batch Circle.

The amplitude $B_{op}$ of the reference flux density associated with the non-uniform field (at electrode e13 of the EMFM) is calculated using the expression:

$$B_{op} = [\beta\lambda_{op}\exp(-\mu_{op}\beta)] \times [I_2 R_{ch}] \times \left[\frac{\rho(\alpha_1\gamma)^2 S}{\cos\theta_1}\right]$$

where $I_2$ is the amplitude of the electrical current associated with the 'non-uniform' magnetic field which flows, in opposite directions, in the upper and lower coils at frequency $f_2$. The value of $I_2$ depends on the wire used for the coil windings and on the value of $I_1$, so that the overall r.m.s. current in each coil does not exceed the current carrying capacity of the wire. Typically, $I_2$ is in the range 0.25 A to 3 A. The values of $\lambda_{op}$ and $\mu_{op}$ used in the equation are particular to the specific geometric type of EMFM under consideration, and are found by mathematical modelling. The values for $\lambda_{op}$ and $\mu_{op}$ for the specific EMFM in this example are 0.0026 GmA$^{-1}$ and 0.1001 respectively.

FIGS. 4.1, 4.2 and 4.3 respectively show, for the cosine coil system of the Example, the distribution of the y component of the non-uniform magnetic field in the flow cross section, the distribution of the x component of the non-uniform magnetic field in the flow cross section and the direction of the flux density vector of the non-uniform magnetic field in the flow cross section for the specific case where: (a) the coil currents in the upper and lower coils are both 1.9085 A but in opposite directions; (b) $N_{TOT}$=622; (c) $R_{ch}$=0.05 m; and (d) $\beta$=2.4. It is straightforward to infer from FIGS. 4.1, 4.2 and 4.3 that both the local amplitude and the local direction of the non-uniform magnetic field have large spatial variations in the flow cross-section.

FIGS. 4.1 to 4.3 show that, at a given instant in time, the non-uniform magnetic field, which is obtained using wire batches of rectangular cross section as described above, has very large spatial variations in both the magnitude and direction of the local flux density in the flow cross section. This facilitates good discrimination between the flow induced potential distributions produced by different velocity profiles.

The preferred embodiments of the present invention provide an EVT apparatus incorporating a "cosine coil" system which comprises an upper coil and a lower coil. During use, in a "uniform magnetic field" configuration, at any instant in time, equal electrical currents are made to flow in the same direction in the upper and lower coils, whereas in a non-uniform field configuration, at any instant in time, currents of equal magnitude are made to flow in opposite directions in the upper and lower coils. When installed and viewed in cross section, the upper and lower coils appear as an array of discrete batches of wires surrounding the flow conduit. The number of wires in a given batch is proportional to |cos θ| where θ is the angular position which that batch subtends with the increasing x axis. Thus, the sizes of the wire batches vary with θ.

In the preferred embodiments of the present invention, for optimum homogeneity of the uniform magnetic field in the flow cross-section, the geometric centres of all of the discrete batches of wires must lie on the same 'batch circle' of radius $R_{bc}$.

When installed and viewed in cross section, the discrete batches of wires in the two coils extend from angular positions $\theta_d$ to $\theta_\alpha$ and from $\theta_b$ to $\theta_c$ as shown in FIG. 3. Both of these angular ranges include wire batches from the upper and lower coils. For optimum homogeneity of the uniform magnetic field in the flow cross-section, the angular separation $\Delta\theta$ between the geometric centres of adjacent batches of wires lying between $\theta_d$ and $\theta_\alpha$ and between $\theta_b$ and $\theta_c$ is constant.

For optimum homogeneity of the uniform magnetic field in the flow cross-section in EVT applications, the 'first' wire batch in the upper coil preferably subtends an angle $0.5 \times \Delta\theta$ with the increasing x-axis whilst the 'last' batch in the upper coil subtends an angle of $0.5 \times \Delta\theta$ with the decreasing x-axis. Similarly, the 'first' batch in the lower coil subtends an angle of $-0.5 \times \Delta\theta$ with the increasing x-axis and the 'last batch in the lower coil subtends an angle of $-0.5 \times \Delta\theta$ with the decreasing x-axis. It is therefore apparent that there are no wire batches for which the geometric centres lie at angular positions of 0° or 180°.

For optimum homogeneity of the uniform magnetic field in the flow cross-section, the angular separation $\Delta\theta$ between the geometric centres of adjacent wire batches should be as small as possible. Practical limitations mean that $\Delta\theta$ will typically lie in the range $10° \leq \Delta\theta \leq 20°$.

In any given cosine coil system, the cross-sectional shapes of the wire batches should all be the same. The preferred embodiments described herein comprise wire batches of rectangular cross-section. However for different cosine coil systems the cross-sectional shapes may have a range of geometries including circular, square, rectangular and 'truncated triangular' or 'wedge shape'.

For wire batches of rectangular cross section, to achieve optimum homogeneity of the uniform magnetic field in the flow cross section the 'batch circle radius' $R_{bc}$ preferably lies in the approximate range $1.345 R_{ch} \leq R_{bc} \leq 1.66 R_{ch}$, where $R_{ch}$ is the radius of the flow channel.

The base width $\hat{A}_1$ of the rectangular cross section wire batch with index equal to 1 is given by the expression:

$$\hat{A}_1 = \alpha_1 \gamma R_{ch}$$

where the preferred values of $\gamma$ and $\alpha_1$ are 1.3 and 0.13846 respectively for the system geometry described above. The base width $\hat{A}_k$ of the $k^{th}$ rectangular cross section wire batch can be expressed as:

$$\hat{A}_k = \left[ \frac{|\cos\theta_k|}{\cos\theta_1} \right]^{0.5} \times \hat{A}_1$$

where $\theta_k$ is the angular position subtended with the increasing x axis by the geometric centre of the $k^{th}$ wire batch. The height $\hat{B}_k$ of the $k^{th}$ rectangular cross section wire batch is given by $$\hat{B}_k = \beta \hat{A}_k$$

where $\beta$ is the aspect ratio of the rectangular cross section wire batches and, for optimum uniform field homogeneity in the flow cross section, has the same value for all wire batches within the cosine coil system.

To achieve the required amplitude $B_u$ of the uniform magnetic field flux density, whilst maintaining good homogeneity of the uniform magnetic field in the flow cross section, the value of $\beta$ is preferably in the range $0.5 \leq \beta \leq 4$, with the value of $B_u$ increasing as $\beta$ is increased according to the relationship:

$$B_u = [\beta \gamma \exp(-\mu\beta)] \times [I_1 R_{ch}] \times \left[ \frac{\rho(\alpha_1 \gamma)^2 S}{\cos\theta_1} \right].$$

To achieve: (a) a uniform magnetic field which is one-dimensional in the flow cross section and which is 'sufficiently' invariant in the axial (z) direction to allow accurate implementation of the EVT velocity profile reconstruction algorithm of the Kollar et al reference identified above, and (b) a non-uniform magnetic field which is two-dimensional in the flow cross section and which is 'sufficiently' invariant in the axial (z) direction to allow calculation of the weight vector values, required by the EVT velocity profile reconstruction algorithm, to be performed using two-dimensional 'virtual current theory' as described in M K Bevir, "The theory of induced voltage electromagnetic flow meters", J. Fluid Mech. (1970), Vol 43, part 3, pp. 577-590—the cosine coils should preferably extend for an axial distance 0.5 L on either side of the plane of the EVT electrode array where $4R_{ch} \leq L \leq 8R_{ch}$.

For an EVT system with an array of 16 electrodes, in order to minimise the quadrature noise that is inductively coupled into the signal cables leading from the electrodes to the signal processing circuitry, the angular separation $\Delta\theta$ of adjacent wire batches should preferably be equal, or close, to 11.25°.

In the "non-uniform magnetic field configuration, for cosine coil geometries of the types described above, there is sufficient variation in both the magnitude and direction of the local magnetic flux density in the flow cross section to enable good discrimination between the flow induced potential distributions that would be produced by the 'candidate' velocity profiles predicted using the EVT reconstruction algorithm of the Kollar et al reference identified above.

Various other embodiments of the monitoring apparatus and method of the present invention within the scope of the appended claims will readily be apparent to those skilled in the art.

The invention claimed is:

1. An apparatus for monitoring a fluid flow in a pipe using electromagnetic velocity tomography (EVT), the apparatus comprising a pipe defining a flow conduit, a coil system comprising electrically conductive wires located externally of the flow conduit for generating composite magnetic fields within the flow conduit, and an array of electrodes located externally of the flow conduit for detecting voltages induced in an electrically conducting fluid flowing thorough the magnetic field, wherein the position of the electrically conductive wires around the flow conduit is defined by a coordinate system having mutually orthogonal x and y axes extending in positive and negative directions in a first plane from an origin located at a geometrical center of a cross-section of the flow conduit, the first plane being orthogonal to a longitudinal direction of the flow conduit, the coil system comprising first and second coils located on respective opposite sides of the x axis, wherein each of the first and second coils comprises K sub-coils, wherein K>1 and in each of the first and second coils the respective sub-coils are electrically connected together, wherein in each of the first and second coils the respective sub-coils are mutually circumferentially nested together and extend parallel to the longitudinal direction of the flow conduit whereby each of the sub-coils, when viewed in cross-section orthogonal to the longitudinal direction, comprises a respective pair of wire batches on respective opposite sides of the y axis and the first and second coils cumulatively comprise a series of the wire batches which are mutually spaced around at least one first circular line surrounding a circumference of the flow conduit, each wire batch comprising a plurality of the electrically conductive wires crossing the first plane in a direction orthogonal to the first plane, wherein there are 2K wire batches in each of the first and second coils and 4K wire batches in total in the first and second coils, wherein the wire batches of the first coil are located within the angular range $0<\theta<180°$ and the wire batches of the second coil are located within the angular range $180<\theta<360°$, wherein the angle $\theta$ is defined as an angle relative to the x axis in the positive direction whereby the angle $\theta$ is 0° along the positive x axis and 180° along the negative x axis, a geometrical center of the $k^{th}$ wire batch subtends an angle $\theta_k$, and each $k^{th}$ wire batch comprises $N_k$ wires and $N_k$ is proportional to $|\cos \theta_k|$.

2. An apparatus according to claim 1 wherein the apparatus further comprises magnetic signal driving circuitry which is arranged to pass electrical current through one or more of the wire batches thereby to transmit a magnetic field from the wire batches into the flow conduit, wherein each wire batch is electrically connected to the magnetic signal driving circuitry, and wherein the magnetic signal driving circuitry is configured to pass electrical current (i) in a first operational mode through one or more of the wire batches of both of the first and second coils so that, when the first and second coils are viewed along the y axis, in each of the first and second coils the electrical current is in the same rotational direction to generate a uniform magnetic field in the flow conduit in the first operational mode and (ii) in a second operational mode through one or more of the wire batches of both of the first and second coils so that, when the first and second coils are viewed along the y axis, in the first and second coils the electrical current is in respective opposite rotational directions to generate a non-uniform magnetic field in the flow conduit in the second operational mode, wherein the magnetic signal driving circuitry is configured selectively to drive the first and second coils in either of the first and second operational modes.

3. An apparatus according to claim 1 wherein for the wire batches of the first coil the respective values of the index k are non-sequential with increasing angle $\theta$ within the angular range $0<\theta<180°$ and for the wire batches of the second coil the respective values of the index k are non-sequential with increasing angle $\theta$ within the angular range $180<\theta<360°$.

4. An apparatus according to claim 3 wherein for the wire batches of the first coil the value of the index k is 1 for the wire batch having the lowest value of angle $\theta$ within the angular range $0<\theta<180°$, the index k increases sequentially to a value of k=n with increasing values of angle $\theta$ within the angular range $0<\theta<90°$, the value of the index k is n+1 for the wire batch having the highest value of angle $\theta$ within the angular range $0<\theta<180°$, and the index k increases sequentially to a value of k=m with decreasing values of angle $\theta$ within the angular range $180<\theta<90°$, and for the wire batches of the second coil the value of the index k is m+1 for the wire batch having the lowest value of angle $\theta$ within the angular range $180<\theta<360°$, the index k increases sequentially to a value of k=p with increasing values of angle $\theta$ within the angular range $180<\theta<270°$, the value of the index k is p+1 for the wire batch having the highest value of angle $\theta$ within the angular range $180<\theta<360°$, and the index k increases sequentially to a value of k=q with decreasing values of angle $\theta$ within the angular range $270<\theta<360°$, the index k thereby varying from 1 to q within the angular range $0<\theta<360°$.

5. An apparatus according to claim 1 wherein each wire batch forms a polygonal cross-section at the first plane.

6. An apparatus according to claim 1 wherein wire batches in each of the respective first and second coils are mutually separated by an angle $\Delta\theta$ from the wire batches of adjacent sub-coils in the respective first and second coils, optionally wherein either the angle $\Delta\theta$ is constant within the first coil and constant within the second coil, and further optionally the same value within both the first coil and the second coil, or alternatively the angle $\Delta\theta$ is non-uniform in the coil system.

7. An apparatus according to claim 6 wherein in each of the respective first and second coils the number of sub-coils K and the angle $\Delta\theta$ have the relationship $(K-0.5)\Delta\theta <90°$.

8. An apparatus according to claim 7 wherein the wire batches of the first coil are located within the angular range $(\Delta\theta/2)$ to $(180-\Delta\theta/2°)$ and the wire batches of the second coil are located within the angular range $(180+\Delta\theta/2)$ to $(360-\Delta\theta/2)°$.

9. An apparatus according to claim 8 wherein in the first coil the wire batches in the sub-coil located closest to the y axis, the wire batches being on respective opposite sides of the y-axis, are located at the angular positions $\theta_a=(K-0.5)\Delta\theta°$ and $\theta_b=180-((K-0.5)\Delta\theta)°$ where $\theta_a$ is the angular position of the wire batch when x and y are positive and $\theta_b$ is the angular position of the wire batch when x is negative and y is positive, and in the second coil the wire batches in the sub-coil located closest to the y axis, the wire batches being on respective opposite sides of the y-axis, are located at the angular positions $\theta_c=180+((K-0.5)\Delta\theta)°$ and $\theta_d=360-((K-0.5) \Delta\theta)°$ where $\theta_c$ is the angular position of the wire batch when x and y are negative and $\theta_d$ is the angular position of the wire batch when x is positive and y is negative.

10. An apparatus according to claim 1 wherein the wire batches of the first coil and the wire batches of the second coil are symmetrical about a z-direction plane comprising the x-axis and a z-axis orthogonal to the x-axis and to the y-axis.

11. An apparatus according to claim 1 wherein geometrical centers of the wire batches of the first coil and the wire batches of the second coil are at a radial distance $R_{bc}$ from the origin located at the geometrical center of the cross-section of the flow conduit, wherein $R_{bc}$ is greater than an internal radius $R_{ch}$ of the flow conduit and wherein the radial distance $R_{bc}$ is a common radial distance $R_{bc}$ for the wire batches of the first coil and the wire batches of the second coil.

12. An apparatus according to claim 1 wherein each sub-coil comprises two linear side portions symmetrically spaced on opposite sides of the y axis and extending parallel to the longitudinal direction of the flow conduit and two end portions, each end portion connecting the two linear side portions at a respective end of the side portions, wherein each end portion is in the shape of an arc of an annulus surrounding the circumference of the flow conduit, and is orthogonal to the longitudinal direction of the flow conduit.

13. An apparatus according to claim 1 wherein each wire batch forms a rectangular or square cross-section at the first plane.

14. An apparatus according to claim 1 wherein:
each $k^{th}$ wire batch has a width $\hat{A}_k$ in a direction tangential to the circular line and a height $\hat{B}_k$ in a radial direction from the origin, and
the aspect ratio $\beta$ of the wire batches is defined as $$\beta = \frac{\hat{B}_k}{\hat{A}_k}.$$

15. An apparatus according to claim 14 wherein the aspect ratio $\beta$ of the wire batches is constant for all values of k.

16. An apparatus according to claim 14 wherein the aspect ratio $\beta$ of the wire batches is within the range $0.5 \leq \beta \leq 4$.

17. An apparatus according to claim 1 wherein each wire batch forms a cross-section at the first plane which is in the shape of an arc of an annulus surrounding the circumference of the flow conduit.

18. An apparatus according to claim 17 wherein:
each $k^{th}$ wire batch has a mean width $\hat{A}_k$ in an azimuthal direction according to the formula: $\hat{A}_k = (2\pi R_{bc} \varepsilon_k)/360$ where $R_{bc}$ is the radius from the origin to a geometrical center of the $k^{th}$ wire batch and $\varepsilon_k$ is the angle in degrees subtended at the origin by the $k^{th}$ wire batch, and
each $k^{th}$ wire batch has a height Br in a radial direction from the origin according to the formula: $\hat{B}_k = R_{o,k} - R_i$
where $R_{o,k}$ is the outer radius of the $k^{th}$ wire batch from the origin, $R_i$ is the inner radius of the wire batch from the origin and $R_i$ is greater than or equal to $5.78 R_{ch}^{0.637}$ where Rch is the internal radius of the flow conduit,
and the aspect ratio $\beta$ of the wire batches is defined as $$\beta = \frac{\hat{B}_k}{\hat{A}_k}.$$

19. An apparatus according to claim 18 wherein the aspect ratio $\beta$ of the wire batches is constant for all values of k.

20. An apparatus according to claim 1 wherein the wire batches of the first coil and the wire batches of the second coil are symmetrical about a z-direction plane comprising the x-axis and a z-axis orthogonal to the x-axis and to the y-axis.

21. An apparatus according to claim 1 wherein geometrical centers of the wire batches of the first coil and the wire batches of the second coil are at a radial distance $R_{bc}$ from the origin located at the geometrical center of the cross-section of the flow conduit, wherein $R_{bc}$ is greater than an internal radius $R_{ch}$ of the flow conduit, and wherein the radial distance $R_{bc}$ is a common radial distance $R_{bc}$ for the wire batches of the first coil and the wire batches of the second coil.

22. An apparatus according to claim 1 wherein a radially inner end of each electrode is located at an inner circumferential surface of the pipe or the radially inner end of each electrode is located radially outwardly from the inner circumferential surface of the pipe and the electrode is configured to be, in use, capacitively coupled to the fluid flow in the flow conduit.

23. An apparatus according to claim 1 wherein the array of electrodes comprises a series of mutually spaced electrodes extending around a second circular line surrounding the circumference of the flow conduit, the electrodes being located in the first plane and wherein each of the electrodes is located equidistant between a respective pair of the wire batches.

24. An apparatus according to claim 23 wherein each of the electrodes is connected to an electrically conductive signal cable extending radially away from the flow conduit and a portion of the signal cable adjacent to the respective electrode extends between the respective adjacent wire batches and wherein each portion of the signal cable adjacent to the respective electrode extends equidistant between the respective adjacent wire batches.

* * * * *